(12) United States Patent
Jaisinghani et al.

(10) Patent No.: US 9,239,715 B1
(45) Date of Patent: Jan. 19, 2016

(54) CANCEL AND ROLLBACK UPDATE STACK REQUESTS

(71) Applicant: Amazon Technologies, Inc., Reno, NV (US)

(72) Inventors: Avinash Jaisinghani, Seattle, WA (US); Jaykumar Harish Gosar, Seattle, WA (US); Pete Peerapong Janes, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1 day.

(21) Appl. No.: 14/036,700

(22) Filed: Sep. 25, 2013

(51) Int. Cl.
G06F 9/44 (2006.01)
G06F 9/445 (2006.01)

(52) U.S. Cl.
CPC .................................. G06F 8/65 (2013.01)

(58) Field of Classification Search
None
See application file for complete search history.

(56) References Cited

U.S. PATENT DOCUMENTS

| | | | |
|---|---|---|---|
| 6,279,153 B1* | 8/2001 | Bi et al. | 717/171 |
| 6,996,817 B2* | 2/2006 | Birum et al. | 717/170 |
| 2002/0073410 A1* | 6/2002 | Lundback et al. | 717/171 |
| 2006/0074734 A1* | 4/2006 | Shukla et al. | 705/8 |
| 2007/0169075 A1* | 7/2007 | Lill et al. | 717/168 |
| 2011/0320605 A1* | 12/2011 | Kramer et al. | 709/226 |
| 2011/0321024 A1* | 12/2011 | Knothe et al. | 717/168 |
| 2014/0068584 A1* | 3/2014 | Lim et al. | 717/168 |

* cited by examiner

*Primary Examiner* — Wei Zhen
*Assistant Examiner* — Timothy Duncan
(74) *Attorney, Agent, or Firm* — Davis Wright Tremaine LLP

(57) ABSTRACT

At a time after receiving a request to cancel and rollback an update request for a computer system, one or more computer resources within a computer system invoke one or more computer system capabilities at least to cancel computer system operations to update the computer. When the computer system operations to update the computer system are cancelled, one or more computer resources within a computer system invoke one or more computer system capabilities at least to roll back the computer system to a previous good state.

22 Claims, 15 Drawing Sheets

CANCEL AND ROLLBACK UPDATE STACK REQUESTS

BACKGROUND

Many modern computing systems exist in a volatile state. In order to ensure system reliability, security and availability, updates and patches may be applied to the system. In order to ensure system availability, performance and an optimal user experience, subsystems and components must be updated, altered and replaced equally frequently. In many modern computing systems, and especially those that involve virtualized and distributed computing environments, wherein a large plurality of systems work in concert to provide a set of functionality to a large number of users, system updates can take a significant amount of time. In such systems, the cooperative nature of the systems may mean that a simple update to a single subsystem may require updates to all subsystems. When a system update is undesirable, possibly because, for example, a bad configuration or performance problems, undoing the update can require an even more significant amount of time, often requiring manual intervention by computing system operators and lengthy system outages while the update is removed.

BRIEF DESCRIPTION OF THE DRAWINGS

Various embodiments in accordance with the present disclosure will be described with reference to the drawings, in which.

DETAILED DESCRIPTION

Figure 1:
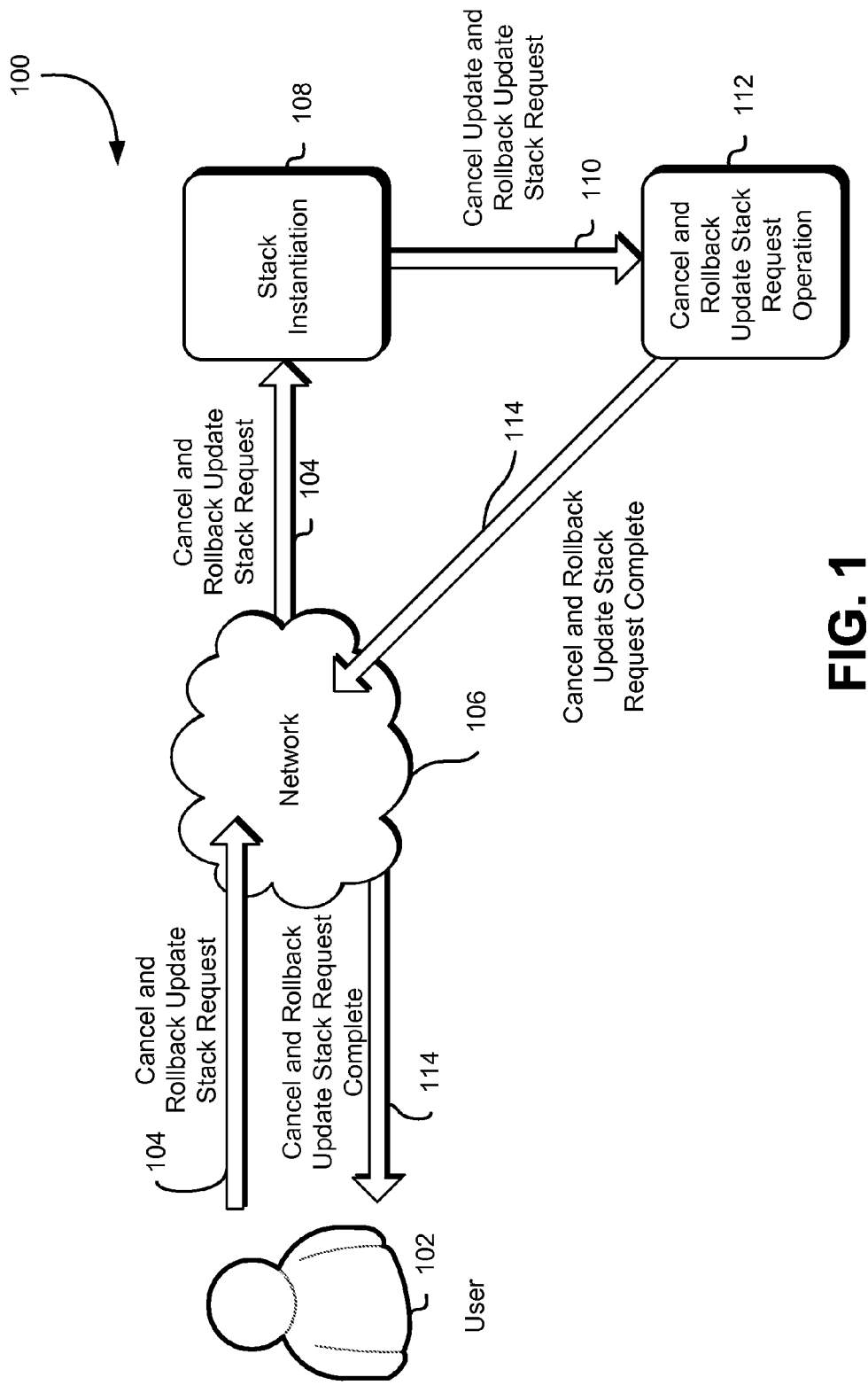
FIG. 1 illustrates an example environment in which an update request sent to computer resources may have that update cancelled and rolled back in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for cancelling and reversing updates to systems and executable code operating thereon. In particular, techniques are disclosed for utilizing system capabilities to facilitate cancelling and reversing updates to computing systems, including, but not limited to, computer systems that consist of distributed sets of subsystems and resources, further including, but not limited to, virtualized and non-virtualized subsystems and resources. In such distributed and/or virtualized systems, a plurality of subsystems or computer resources may exist which may consist of one or more instances of a number of different types and configurations of subsystems, including, but not limited to, load balancers, scaling groups, computing systems, database systems, database storage, block storage systems, block storage, data domains, system properties and system configurations. A description of this set of resources that includes the type, number, and configuration of the resources may be referred to as a stack and the actual working implementation of the set of computer resources may be called a stack instantiation. Stacks may be described using templates, which may include lists of abstract and/or specific resources such as number and types of systems, system parameters, system configurations, software, hardware and/or virtual machines that may be used to create a stack instantiation. Updates to distributed and/or virtualized systems such as those described herein may require updates to some or all of these subsystems and may, in some situations, take an extensive amount of time to complete. During such updates, the subsystems and the overall system may be partially or, in some situations, wholly unavailable to users of the computer system. This unavailability may be compounded in situations where the update has undesirable results, perhaps because an error may have been introduced, or where the configuration was not properly set, or where needed functionality was lost, or for a variety of other reasons. If an update has to be reversed, this rollback can, in some situations, take as long as, or longer than the original update, and may greatly increase the downtime and loss of system availability to users of the computer system.

For example, a stack update may include applying the same software updates to fifty identical virtual machine instances. If, upon completion of the software updates to the first of these virtual machine instances, a system operator discovers an error in the software update, the operator may have to wait for the update to complete on each system before fixing the error.

Cancel and rollback of computer system updates to distributed and/or virtualized computer systems may be facilitated by implementing functionality to cancel and rollback update stack requests. An update stack request may be a request to update some or all of the computer resources of a stack implementation according to instructions which may, in some embodiments, be contained in the request or may, in some embodiments, be a separate set of instructions. The request may include specific instructions to perform the update, or it may include simple instructions to tell each computer resource to update itself, or it may include instructions to create or destroy computer resource instances or it may include combinations of these and/or other instructions. A command to cancel and rollback an update stack request may be a command to cancel and/or undo (or rollback) an update stack request according to instructions which may be contained in the command and/or may be a separate set of instructions. In some embodiments, a command to cancel and rollback an update stack request may only perform cancel operations, may only perform rollback operations or may do both. Thus in the above example, a system operator may cancel the update on some or all of the virtual machine instances when the error is discovered, and may begin the rollback sooner and in a more efficient manner.

In some embodiments, cancel and rollback update stack request functionality may include functionality to cancel and/or rollback only an in-progress update. In some embodiments, cancel and/or rollback of in-progress, pending, partially complete, fully complete, and/or other types of updates may be allowed. The command or commands to cancel and/or rollback an update to a computer system may be originated by an outside server, or may be originated by a user on a remote network location, or may be originated from the computer system itself or may come from a combination of these and/or other systems. The command or commands to cancel and/or rollback an update to a computer system may, in some embodiments, be issued by a trusted user, or by a standard user, or by an autonomous process, or as a result of an alarm or condition or by a combination of these and/or other methods. In some embodiments, the command or commands to cancel and/or rollback an update to a computer system may be verified for integrity and authenticated using various methods, such as be using passwords, or evaluating a public and private cryptographic key, or by verifying it against computer system ownership or policy, or by a combination of these and/or other validation and authentication methods.

In some embodiments, once a command to cancel and/or rollback an update to a computer system is received, that command may be processed by one or more subsystems of the computer system, or by a dedicated hardware, firmware and/or software component of the computer system. Those systems, subsystems and/or hardware, firmware and/or software components of the computer system that process commands to cancel and/or rollback an update to a computer system are referred to herein as computer system entities or as computer resources. In some embodiments, the command to cancel and/or rollback an update may be processed by a receiving computer system entity. In some embodiments, the command may be relayed by a receiving computer system entity to other computer system entities. In some embodiments, the command to cancel and/or rollback an update may be both processed by a receiving computer system entity and relayed by the receiving computer system entity to other computer system entities. In some embodiments where the command to cancel and/or rollback an update is relayed by a receiving computer system entity to other computer system entities, those other computer system entities may also either process the command, relay the command to other computer system entities or both process and relay the command to other computer system entities.

In some embodiments, a computer system entity that processes a command to cancel and/or rollback an update to that computer system entity may verify the applicability of the command by ensuring that the computer system entity is in a state where the update can be cancelled and/or rolled back. The processing of the request to cancel and/or rollback update to a computer system entity may be allowed in some embodiments if the update is pending, but not yet started. In some embodiments, the processing of the request to cancel and/or rollback an update to a computer system entity may be allowed after the update is started, but not yet completed. In some embodiments, the processing of the request to cancel and/or rollback an update to a computer system entity may be allowed after the update has completed, but not yet finalized. In some embodiments, the processing of a request to cancel and/or rollback an update to a computer system entity may be allowed even after the update has been finalized, but only if all of the other updates have not been finalized. In some embodiments, the processing of a request to cancel and/or rollback an update to a computer system entity may be allowed under any circumstances. The policies about when the cancellation and/or rollback of updates are allowed may depend on a variety of factors, including, but not limited to, the type and scope of the update, the state of the computer system entity, the type of the computer system entity, system reliability concerns, system security concerns, system policies, system availability concerns, business logic, and/or a combination of these and/or other factors. In some embodiments, the processing of the request to cancel and/or rollback an update to a computer system entity may result in the computer system entity executing a variety of commands and may also result in the computer system entity passing through one or more internal states while executing those commands. Implementation of the commands to cancel and rollback of updates, commands to process system states, commands to monitor progress as well as other commands to complete this operation may be implemented as part of an existing and/or new application programming interface (API) running on one or more computer resources or computer entities on the computer system.

In some embodiments, the functionality to cancel and/or rollback an update request to a computer system may be performed by the implementation and processing of workflows. A workflow may be a set of operations that, when executed or performed in a defined order, accomplish system functionality. Workflows may be nested and/or combined. A workflow to return the system state to a previous state in response to a command to cancel and rollback an update to a computer system may, in some embodiments, be issued in conjunction with a command to cancel and rollback update to a computer system and may, in some embodiments, be issued separately from a command to cancel and rollback an update to a computer system. A workflow to return the system state to a previous state in response to a command to cancel and rollback an update to a computer system may come from an outside server, or may come from a user on a remove network location, or may come from the computer system itself, or may come from a combination of these and/or other systems and/or locations. A workflow to return the system state to a previous state in response to a command to cancel and rollback an update to a computer system may, in some embodiments, be issued by a trusted user, or by a standard user, or by an autonomous process, or as a result of an alarm or condition, or by a combination of these and/or other methods. A workflow to return the system state to a previous state in response to a command to cancel and rollback an update to a computer system may be verified for integrity and authenticated using various methods, such as by using passwords, or evaluating a public and private cryptographic key, or by verifying it against computer system ownership or policy, or by a combination of these and/or other validation and authentication methods.

In some embodiments, workflow operations to return the system state to a previous state in response to a command to cancel and rollback an update to a computer system may be processed by one or more computer system entities. In some embodiments, workflow operations may be processed by a receiving computer system entity. In some embodiments, workflow operations may be relayed by a receiving computer system entity to other computer system entities. In some embodiments, workflow operations may be both processed by a receiving computer system entity and relayed by the receiving computer system entity to other computer system entities. In some embodiments, a receiving computer system entity may process some of the workflow operations, forward some of the operations, and both process and forward some of the operations. Where the workflow operations are relayed by a receiving computer system entity to other computer system entities, those other computer system entities may also process the operations, relay the operations to other computer system entities or do a combination of both.

In some embodiments, a computer system entity that processes operations of a workflow to cancel and/or rollback update to a computer system entity may verify the applicability of the commands by ensuring that the computer system entity is in a state where the steps of the workflow may be executed. For example, the processing of operations to rollback an update may be allowed only after the update is cancelled. In some embodiments, the processing of some of the operations to rollback an update may be allowed before the cancel has completed. The policies about when the processing of operations in workflows may be allowed may be part of the workflow, may be part of a separate policy implementation or may be part of a combination of these and/or other components of the computer system. The policies about when processing of operations in workflows may be allowed may depend on a variety of factors, including, but not limited to, the type and scope of the update, the type and scope of the operations, the state of the computer system entity, the type of the computer system entity, system reliability concerns, system security concerns, system policies, system availability concerns, business logic, and/or a combination of these and/or other factors. In some embodiments, the processing of the operations may result in the computer system entity executing a variety of commands and operations and may also result in the computer system entity passing through one or more internal states while executing those commands or operations. Implementation of the commands to process the workflows and execute workflow operations may be implemented as part of an existing and/or new API running on one or more computer resources or computer entities on the computer system.

In some embodiments, a workflow to return the system state to a previous state after cancelling and/or rolling back an update to one or more computer system entities may include a set of commands or operations to restore systems, subsystems, configurations, states, and/or combinations of these and other computer system entities. A rollback workflow may include commands or operations and/or other elements from an update workflow it is rolling back or from a cancel workflow that was used to cancel that update workflow. A rollback workflow may also have its behavior altered or modified according to the contents of those update or cancel workflows. The set of commands may include subsets of the set of commands that must be performed in a specific order and in sequence, subsets of the set of commands that may be performed in any order but must be performed one at a time, subsets of the set of commands that may be performed in any order and may be performed at any time, and/or a combination of these or other subsets of the set of commands. In some embodiments, a workflow may include functionality to perform certain subsets of the set of commands in response to the state of these and/or one or more other computer system entities. In some embodiments, the workflow may include functionality to perform certain subsets of the set of commands in response to the results returned from these and/or other commands and/or subsets of commands. A workflow may, in some embodiments, include functionality to report the status of the update and of individual commands through a variety of methods, including, but not limited to, logs, alarms, alerts, messages, and/or a combination of these and other status reporting methods. In some embodiments, the workflow may include functionality to add to, remove from, and/or otherwise make alterations to the set and/or any subsets of the set of commands of the workflow in response to these status reporting methods, or in response to external commands or processes, or in response to autonomous subsystems on this or other computer systems, and/or in a combination of these or other stimuli. The set of commands of a workflow may include, but not be limited to, commands to update software systems, commands to update operating systems, commands to add instances of computer resources, commands to create new types of computer resources, commands to remove instances of computer resources, commands to add storage systems, commands to change parameters of computer resources, commands to add resources to resource groups, commands to create and destroy resource groups, commands to update data formats, commands to alter, create, or destroy data and/or combinations of these and/or other commands.

Various operations associated with the cancellation and rollback of stack updates, including, but not limited to, the storage and retrieval of commands, the storage and retrieval of workflows, the processing of commands or workflows, the reporting of statuses, may in some embodiments, take advantage of restricted, shared, or otherwise specialized hardware, software, firmware or other computer system components. For example, some software systems such as, but not limited to, computer operating systems, have software update, cancel and rollback functionality incorporated into the software system itself. In such systems, the update, cancel and rollback workflows may be performed by calling some or all of the update, cancel and/or rollback functionality of the computer operating system itself. The entire cancel and rollback update stack request process may be orchestrated by disparate processes and/or components and may utilize generalized components, defined and/or dedicated components such as specific interfaces, specific terminals, specific networks, specific system hardware, specific system software, specific system firmware, and/or a combination of these or other processes and/or components.

FIG. 1 illustrates an example environment 100 for cancelling and rolling back updates to computing systems as well as to the associated code running thereon, in accordance with at least one embodiment. One or more users 102 connect to one or more stack instantiations 108 using one or more networks 106 and/or entities associated therewith, such as servers or other computer systems also connected to the network, either directly or indirectly. The user may, for example, be a user, a system operator, an autonomous process, a computer system, and/or the like. In some embodiments, the user may receive privilege to perform the operations described herein by virtue of location (e.g. by sitting at a dedicated terminal or by attachment to a dedicated and/or specialized network) and/or by the establishment of recognized credentials and/or the like. The network may, in some embodiments, be a local network, an internal network, a public network such as the Internet, a wide-area network, a wireless network, a mobile network, a distributed computing system with a plurality of network nodes, and/or a combination of these and other networks. The aforementioned entities associated with the network may include any device that is capable of connecting with the stack instantiation via a network, including at least servers, laptops, mobile devices such as smartphones or tablets, distributed computing systems and components thereof, abstracted components such as guest computer systems or virtual machines and/or other types of computing devices and/or components. The stack instantiation may, for example, be running directly on server hardware, be running on one or more virtual machines and/or be running as a distributed system with multiple instances on a combination of server hardware, virtual machines, and/or the like.

In some embodiments, the user 102 may send a cancel and rollback update stack request command 104 to stack instantiation 108 via network 106. In some embodiments, the stack instantiation may be a set of one or more computer system resources. The stack instantiation may be in one or more of a number of different states including, for example, running, paused, updating, cancelling, resuming, stopped, started, idle, resetting, and the like. Additionally, in some embodiments, each of the members of the set of one or more computer system resources may be in one or more of a number of different states including, but not limited to, those mentioned herein. The cancel and rollback update stack request command 104 may be received by the stack instantiation 108 in various ways in accordance with various embodiments. It should be noted that other methods of delivering a cancel and rollback update stack request command 104 to the stack instantiation 108 are also considered as being within the scope of the present disclosure. For an illustrative example, the cancel and rollback update stack request command may not come from a separate location, but instead may come from a peer-to-peer network, where each one of a group of stack instantiations, including stack instantiation 108, is configured to both send and receive commands to others in the peer-to-peer network.

Upon receiving a cancel and rollback update stack request command, the stack instantiation may determine if the command can be processed. In some embodiments the determination of whether the cancel and rollback update stack request command can be processed by the stack instantiation may depend on a variety of factors including, but not limited to, the state of the stack instantiation, the presence or absence of one or more computer resources, the state of one or more computer resources and/or a combination of these and/or other factors. For example, in some embodiments the cancel and rollback update stack request command may only be performed if the stack instantiation is in an updating state. In such embodiments, a stack instance that is not in an updating state may reject the cancel and rollback update stack request command. The determination of whether the cancel and rollback update stack request command 104 can be processed by the stack instantiation 108 may be accomplished in various ways in accordance with various embodiments.

In some embodiments, after the stack instantiation 108 has determined that it will process the cancel and rollback update stack request command 104, it will initiate a cancel update and rollback 110, resulting in a cancel and rollback update stack request operation 112. The cancel and rollback update stack request operation may, for example, be a process that runs within the stack instantiation or may be a process that runs separately from the stack instantiation. In some embodiments, the cancel and rollback update stack request operation may itself perform a variety of commands to complete the cancel and rollback of the update stack request. In some embodiments, the cancel and rollback of the update stack request may manage the cancel and rollback operation by directing computer system resources to perform their own cancel and rollback operations as described herein. In some embodiments, the cancel and rollback of the update stack request operation may do a combination of performing commands to complete the cancel and rollback of the update stack request and directing computer system resources to perform their own cancel and rollback update stack request operations. The cancel and rollback update stack request operation may be performed by various entities in various ways and in accordance with various embodiments.

Upon completing all steps for the cancel and rollback update stack request operation, including, for example, canceling the update, performing all rollback operations, updating states, waiting for all computer system resources to complete any operations, and the like, the cancel and rollback update stack request operation may, in some embodiments, report that the cancel and rollback update stack request is complete 114. In some embodiments, the completion report may be a message, or an alert, or a dedicated command, or an alarm, or a watchdog process running either locally or remotely, and/or a combination of these and/or other report methods. Upon processing the cancel command and rollback command and completion of the cancel and rollback update stack request operation, the stack instantiation may be running in a state and configuration that is equivalent to the state and configuration it was in before the original update commenced. The criteria for determining whether, after completion of the cancel and rollback update stack request operation, the state and configuration of the stack instantiation is running in a state that is equivalent to the state and configuration it was in before the original update commenced may, in some embodiments, depend on the stack instantiation, the computer resource or resources, system policies, and/or a combination of these and/or other criteria. In some embodiments, the state and configuration may be identical. In some embodiments, the state and configuration may be functionally equivalent, providing the same set of functionality but by possibly different means. In some embodiments, the state and configuration may be no more than substantially similar according to relevant criteria, including, but not limited to, restoration to a previously known good state. The benefit of cancelling and rolling back a possibly erroneous update stack request in order to return the system to a known good functional state and the benefit of doing so proactively before the potentially erroneous update has completed, has numerous technological advantages including, but not limited to, maximizing system reliability, performance and security while minimizing system unavailability.

Figure 2:
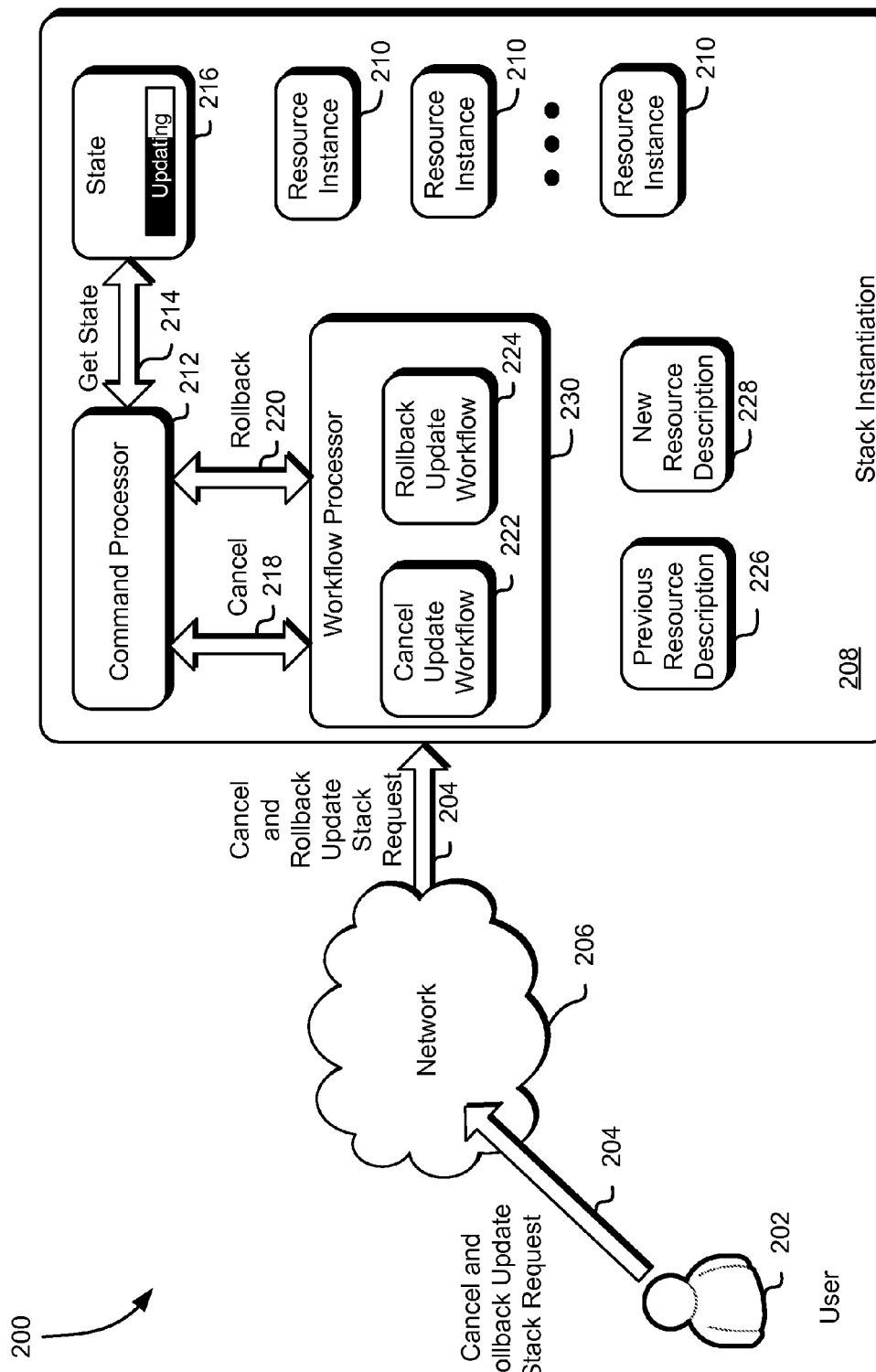
FIG. 2 illustrates an example environment in which an update request sent to computer resources may have that update cancelled, and may have a process for rolling back that update in accordance with at least one embodiment.

As mentioned previously, a stack instantiation may include, in some embodiments, a number of computer resources. FIG. 2 illustrates an example environment 200 for cancelling and rolling back updates to computing systems as well as the associated code running thereon, in accordance with at least one embodiment. One or more users 202 connect to one or more stack instantiations 208 using one or more networks 206 and/or entities associated therewith, such as servers or other computer systems also connected to the network, either directly or indirectly, as described at least in connection with FIG. 1. In some embodiments, a cancel and rollback update stack request command 204 may be communicated to one or more stack instantiations 208 via one or more networks 206, as described at least in connection with FIG. 1. The cancel and rollback update stack request command 204 may be received by a command processor 212. In some embodiments, the command processor may be: a dedicated process that runs on one or more of the computer system resource instances ("resource instances") 210 of the stack instantiation; a component or a collection of components of the operating system of one or more of the resource instances of the stack instantiation; a subset of one or more of the resource instances of the stack instantiation; a dedicated network interface on one or more of the resource instances of the stack instantiation; an executable program that executes on one or more of the resource instances of the stack instantiation; or a combination of one or more dedicated processes, components of the operating systems, resource instances, network interfaces, executable programs and the like.

The cancel and rollback update stack request command 204 may be received by the command processor 212 in various ways in accordance with various embodiments. As an illustrative example, in some embodiments, the cancel and rollback update stack request command may be issued by an operator as a network command and may be received by a dedicated process running on a resource instance of the stack instantiation. As another illustrative example, in some embodiments, the cancel and rollback update stack request command may be issued as a system alarm by an autonomous process as a response to a computer system event and may be received by a watchdog process dedicated to that alarm. It should be noted that other ways of receiving the cancel and rollback update stack request command by the command processor are also considered as being within the scope of the present disclosure.

Upon receiving the cancel and rollback update stack request command, the command processor may, in some embodiments, first determine if the stack instantiation can process the command. In some embodiments, the command processor may determine if the stack instantiation may process the command to cancel and rollback the update stack request based upon, in some embodiments and among other factors, the state 216 of the stack instantiation, as described at least in connection with FIG. 1. The command processor may, for example, issue a get state command 214 to the state 216 to determine if the state is one that allows cancelling and rolling back an update. In some embodiments, the controlling logic that determines whether the stack instantiation may process the command to cancel and rollback the update stack request may be part of the command processor, or may be part of another component of the stack instantiation, or may be part of an external process or server, or may be part of a combination of these and/or other components.

Upon receiving the command to cancel and rollback the update stack request, and upon determining that the command may be processed by the stack instantiation according to state and/or other factors, the command processor may begin a cancel 218. In some embodiments, when the command processor begins a cancel 218. The command processor may begin a rollback 220 by beginning, in some embodiments, a cancel update workflow 222. A cancel update workflow may describe the details of how the cancel update part of a cancel and rollback update stack request may be accomplished. In some embodiments, the cancel update workflow may be executed by the command processor as a combination of one or more dedicated processes, components of the operating systems, resource instances, network interfaces, executable programs and the like as described herein. In some embodiments, the cancel update workflow may be executed by a workflow processor 230 as a combination of one or more dedicated processes, components of the operating systems, resource instances, executable programs and the like. The cancel update workflow may, in some embodiments, be executed by a combination of a command processor, a workflow processor and/or other processors of the like including, but not limited to, one or more resource instances of the stack instantiation.

In some embodiments, the cancel update workflow may be executed as described herein by issuing commands to one or more resource instances of the stack instantiation including, but not limited to, commands to suspend existing update operations, commands to alter or delete log files, commands to alter or delete configuration files, commands to pause and/or restart existing update operations, commands to change states, commands to alter or delete components, commands to restore components, and/or combinations of these and/other such commands. Additionally, in some embodiments, the cancel update workflow may be executed as described herein by issuing commands to the stack instantiation itself including, but not limited to commands to suspend existing update operations, commands to alter or delete log files, commands to alter or delete configuration files, commands to pause and/or restart existing update operations, commands to change states, commands to alter or delete components, commands to restore components, and/or combinations of these and/or other such commands.

A cancel update workflow 222 may, in some embodiments, consist of a set of separate steps. In such embodiments, some or all of the steps of the cancel update workflow may be executed sequentially, one after the other, in a specified order. Some or all of the steps of the cancel update workflow may, in some such embodiments, be executed in any order. Some or all of the steps of the cancel update workflow may, in some such embodiments, be executed only one at a time, either in a specified order or in no order. Some or all of the steps of the cancel update workflow may, in some such embodiments, be executed all at the same time. In some embodiments where the cancel update workflow consists of a set of separate steps, the steps may be executed in a combination of some or all of the sequential or temporal methods mentioned herein. A cancel update workflow may, in some embodiments, execute all of the steps specified in the workflow or a subset of the steps specified in the workflow. The determination of which steps of the cancel update workflow to execute may, in some embodiments, be based on the state or configuration of the stack instantiation, or the state or configuration of the resource instances, or the presence or absence of resource instances, or elements of the previous resource description 226, or elements in the new resource description 228, or a combination of these and/or other factors. In some embodiments, the determination of which steps of the cancel update workflow may be based on the results of other steps in the cancel update workflow. It should be noted that other ways of processing the cancel update workflow are also considered as being within the scope of the present disclosure. As an illustrative example, each resource instance of a stack instantiation may be capable of both sending and receiving as well as processing cancel update commands, allowing the stack instantiation to function as a network of autonomous peers, each capable of cancelling any other under the proper conditions.

In some embodiments, upon completing the cancel update workflow or upon determining that it is not necessary to complete the cancel update workflow, and upon determining that the rollback command may be processed by the stack instantiation according to state and/or other factors, the command processor may begin a rollback 220. In some embodiments, the criteria for determining whether the rollback command may be processed by the stack instantiation may or may not be the same as the criteria that was used to determine whether the cancel command could be processed. The command processor may begin a rollback 220 by beginning, in some embodiments, a rollback update workflow 224. A rollback update workflow describes the details of how the rollback update part of a cancel and rollback update stack request may be accomplished. In some embodiments, the rollback update workflow may be executed by the command processor as a combination of one or more dedicated processes, components of the operating systems, resource instances, network interfaces, executable programs and the like as described herein. In some embodiments, the rollback update workflow may be executed by a workflow processor 230 as a combination of one or more dedicated processes, components of the operating systems, resource instances, executable programs and the like. The rollback update workflow may, in some embodiments, be executed by a combination of a command processor, a workflow processor and/or other processors of the like including, but not limited to, one or more resource instances of the stack instantiation. In some embodiments, the rollback update workflow may be executed as described herein by issuing commands to one or more resource instances of the stack instantiation including, but not limited to, commands to initiate new rollback operations, commands to create, alter or delete log files, commands to create, alter or delete configuration files, commands to pause and/or restart rollback operations, commands to change states, commands to create, alter or delete components, commands to rollback components, and/or combinations of these and/other such commands. Additionally, in some embodiments, the rollback update workflow may be executed as described herein by issuing commands to the stack instantiation itself including, but not limited to commands to initiate new rollback operations, commands to create, alter or delete log files, commands to create, alter or delete configuration files, commands to pause and/or restart rollback operations, commands to change states, commands to create, alter or delete components, commands to rollback components, and/or combinations of these and/other such commands.

A rollback update workflow 224 may, in some embodiments, consist of a set of separate steps. In such embodiments, some or all of the steps of the rollback update workflow may be executed sequentially, one after the other, in a specified order. Some or all of the steps of the rollback update workflow may, in some such embodiments, be executed in any order. Some or all of the steps of the rollback update workflow may, in some such embodiments, be executed only one at a time, either in a specified order or in no order. Some or all of the steps of the rollback update workflow may, in some such embodiments, be executed all at the same time. In some embodiments where the rollback update workflow consists of a set of separate steps, the steps may be executed in a combination of some or all of the sequential or temporal methods mentioned herein. A rollback update workflow may, in some embodiments, execute all of the steps specified in the workflow or a subset of the steps specified in the workflow. The determination of which steps of the rollback update workflow to execute may, in some embodiments, be based on the state or configuration of the stack instantiation, or the state or configuration of the resource instances, or the presence or absence of resource instances, or elements of the previous resource description 226, or elements in the new resource description 228, or a combination of these and/or other factors. In some embodiments, the determination of which steps of the rollback update workflow may be based on the results of other steps in the rollback update workflow. In some embodiments the determination of which steps of the rollback update workflow may be based on the results of steps in the cancel update workflow 222. It should be noted that other ways of processing the rollback update workflow are also considered as being within the scope of the present disclosure. As an illustrative example, each resource instance of a stack instantiation may be capable of performing all rollback operations for itself as well as for other resource instances, allowing the stack instantiation to function as a load-balanced distributed system, portioning out complex rollback operations to other resource instances in the stack instance.

Figure 3:
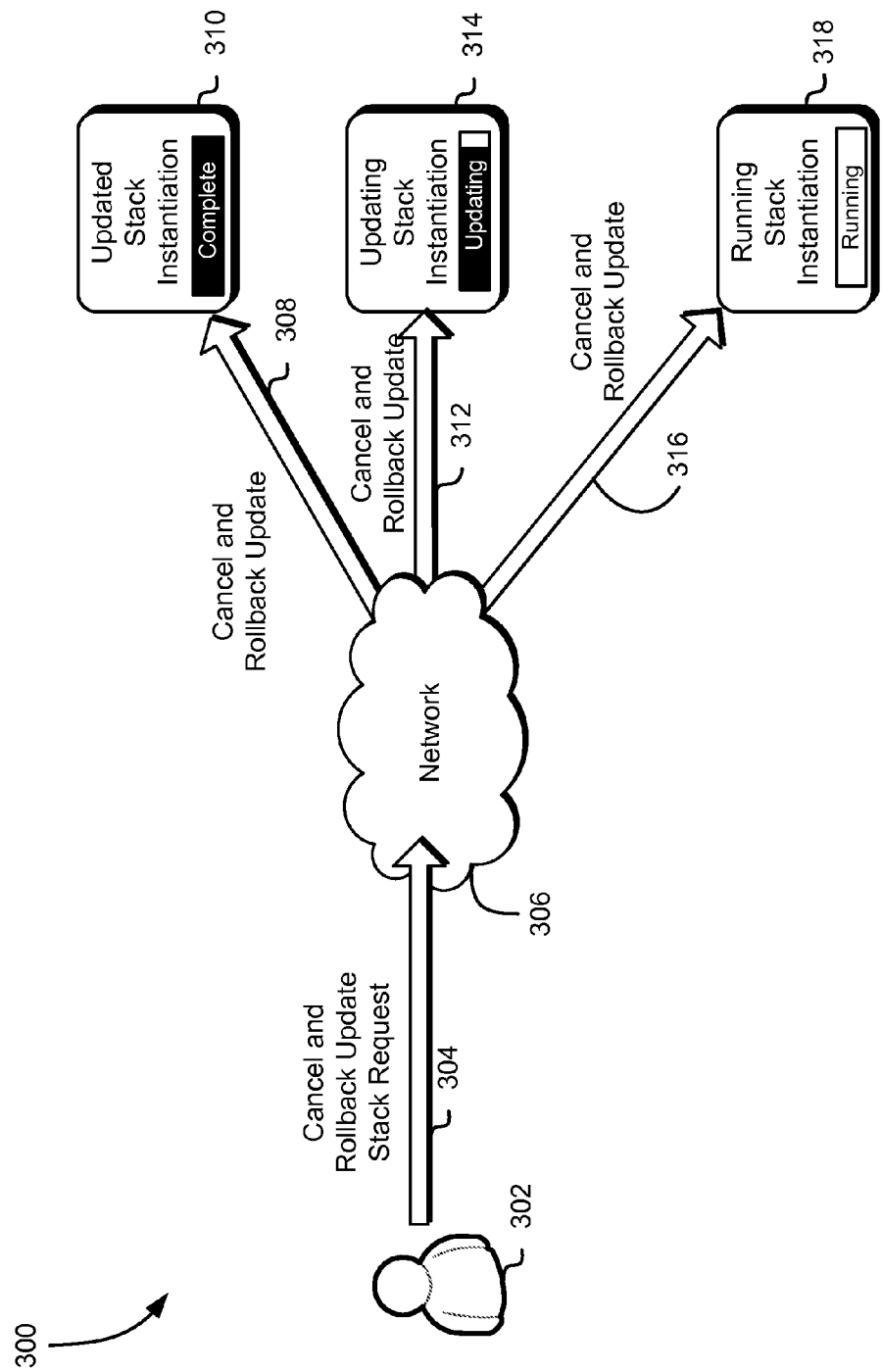
FIG. 3 illustrates an example environment in which a plurality of update requests sent to computer resources may have those updates cancelled and rolled back in accordance with at least one embodiment.

As previously mentioned, the stack instantiation 108 from FIG. 1 and/or the stack instantiation 208 from FIG. 2 may be among a plurality of stack instantiations in a distributed computing system and/or datacenter. FIG. 3 illustrates a distributed computing system and/or datacenter environment 300 in which various embodiments may be exercised. One or more users 302 connect to one or more stack instantiations of various types including, but not limited to, updated stack instantiations 310, updating stack instantiations 314, running stack instantiations 318, and others, using one or more networks 306 and/or entities associated therewith, such as servers or other computer systems also connected to the network, either directly or indirectly, as described at least in connection with FIGS. 1 and 2. In such a distributed computing system and/or datacenter, it may be contemplated that a large number of stack instantiations containing a correspondingly larger number of resource instances may be simultaneously running. Some, or all, of these stack instantiations may, in some embodiments, be substantially similar, with identical or similar resources and configurations and possibly different states and data. In such a distributed computing system and/or datacenter with multiple instantiations of the same stack, it may be desirable in some embodiments to apply the same update to all of the instantiations of the same stack, either at the same time or in a rolling or sequential manner. In the event that the update shows undesirable results, it may be desirable in some embodiments to cancel and rollback that update stack request to all of the instantiations of the same stack.

Thus the techniques for cancelling and rolling back updates to stack instantiations described at least in connection with FIGS. 1 and 2 may be scaled and/or adapted to provide cancel and rollback update stack request functionality to stack instantiations running on a distributed system and/or datacenter environment. If a user 302 issues a cancel and rollback update stack request command 304 to a set of stack instantiations in a distributed system and/or datacenter environment, each of those stack instantiations may, in some embodiments, process the cancel and rollback update stack request command in a different way, and according to techniques described at least in connection with FIGS. 1 and 2. The cancel and rollback update stack request command 308 may be received by an updated stack instantiation 310 according to techniques described at least in connection with FIGS. 1 and 2. The cancel and rollback update stack request command may be partially or fully received and processed or it may be partially or fully refused. For example, in some embodiments, if the update that is being cancelled has completed for this stack instantiation, it may not be able to be cancelled and in some embodiments, the update that cannot be cancelled may not be able to be rolled back. In such embodiments, the cancel and rollback update stack request may both be refused. In some other embodiments, it may not be necessary for the update to be cancelled before it is rolled back. In such embodiments, the cancel may be refused but the rollback update may be allowed. In some other embodiments, the cancel workflow may contain steps that ignore a cancel of a completed update, effectively completing the cancel by doing nothing. In such embodiments, both the cancel and the rollback update may be allowed.

The cancel and rollback update stack request command 316 received by running stack instantiation 318 according to techniques described at least in connection with FIGS. 1 and 2 may, in some embodiments, be refused by the running stack instantiation, or it may, in some embodiments, be accepted by running stack instantiation but effectively ignored. For example, in some embodiments, since there is no associated update to cancel and there is no associated update to rollback, the update can neither be cancelled nor rolled back. In such embodiments, the cancel and rollback update stack request may both be refused. In some other embodiments, the cancel and rollback update stack requests may both or individually be accepted but may effective be ignored because there is nothing to do, as described herein and in connection with FIGS. 1 and 2.

The cancel and rollback update stack request command 312 received by updating stack instantiation 314 according to techniques described at least in connection with FIGS. 1 and 2 may, in some embodiments be accepted by the updating stack instantiation. For example, in some embodiments, the update may be cancelled according to techniques described at least in connection with FIGS. 1 and 2 and may then be rolled back according to techniques also described at least in connection with FIGS. 1 and 2. It may contemplated that, in some embodiments the cancel and/or the update rollback may be refused even when the stack instantiation is updating because of other factors as described at least in connection with FIGS. 1 and 2. For example, the cancel may be refused for a number of reasons including, but not limited to, the user lacking proper authority to issue the command, or because the update has proceeded too far, or because the rollback is not present, or for a combination of these and/or other reasons. Similarly, the update rollback may be refused for a number of reasons including, but not limited to, the user lacking proper authority to issue the command, or because of a lack of available resources, or because of a failure in the cancel, or for a combination of these and/or other reasons. The examples given here and above for the reasons that an update cancellation or rollback may be accepted or refused are not exhaustive. Due to the wide variety of states and sub-states, configurations, and environments that stack instantiations may have in a distributed and/or datacenter environment, there may be a variety of scenarios associated with a variety of embodiments within even a single distributed or datacenter environment. Well-constructed workflows mean that stack instantiations may receive and process cancel and rollback update stack request commands with efficiency and with minimal disruption to their normal operations.

Figure 4:
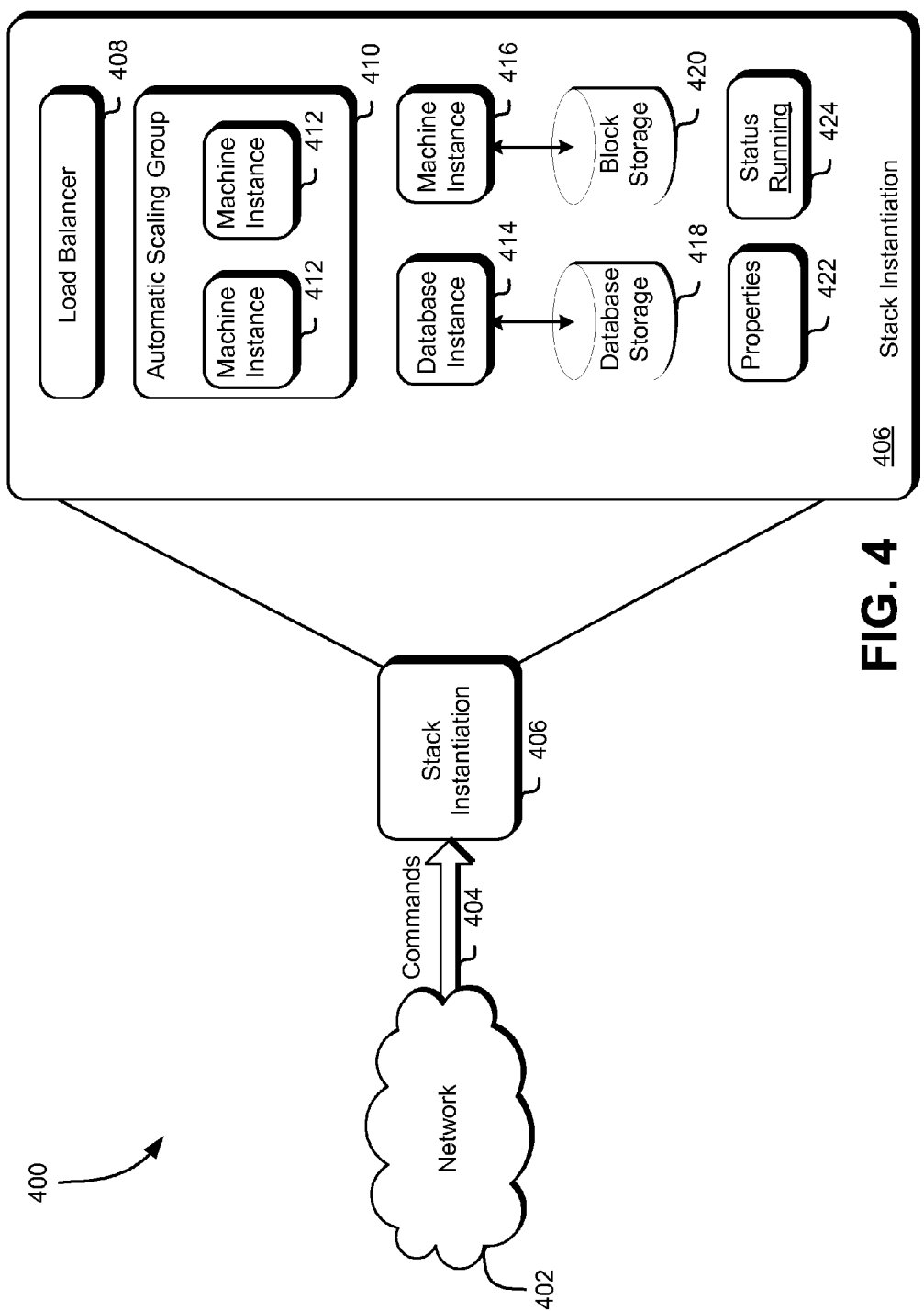
FIG. 4 illustrates an example environment in which a computer system may contain one or more computer resources in accordance with at least one embodiment.

As previously mentioned, the stack instantiations described at least in connection with FIGS. 1-3 may contain a plurality of computer resources. FIG. 4 illustrates an example environment 400 containing a stack instantiation with one or more computer resources that together make up a computing system, as described at least in connection with FIGS. 1-3, and in accordance with at least one embodiment. In some embodiments, commands 404 may be received by stack instantiation 406 from network 402 and/or entities associated therewith, such as servers or other computer systems also connected to the network, either directly or indirectly, as described at least in connection with FIGS. 1-3. The stack instantiation may, as described herein, be made up of a variety of computer resources, including, but not limited to those described and illustrated herein. Examples of computer resources may include, but are not limited to, load balancers 408, automatic scaling groups 410, scaling group machine instances 412, database instances 414, machine instances 416, database storage 418, block storage 420, stack instantiation properties 422 and/or stack instantiation statuses 424. In some embodiments, these computer resources may be physical systems running directly on computer system hardware, may be virtual machines running on shared computer system hardware, may be running on a distributed collection of physical and virtual machines or may be a combination of physical, virtual, distributed, and/or these or other computer system architectures. A single stack instantiation may include multiple instances of any or all of these computer resources. In some embodiments, any or all of these resources may be shared by one or more stack instantiations.

Figure 5:
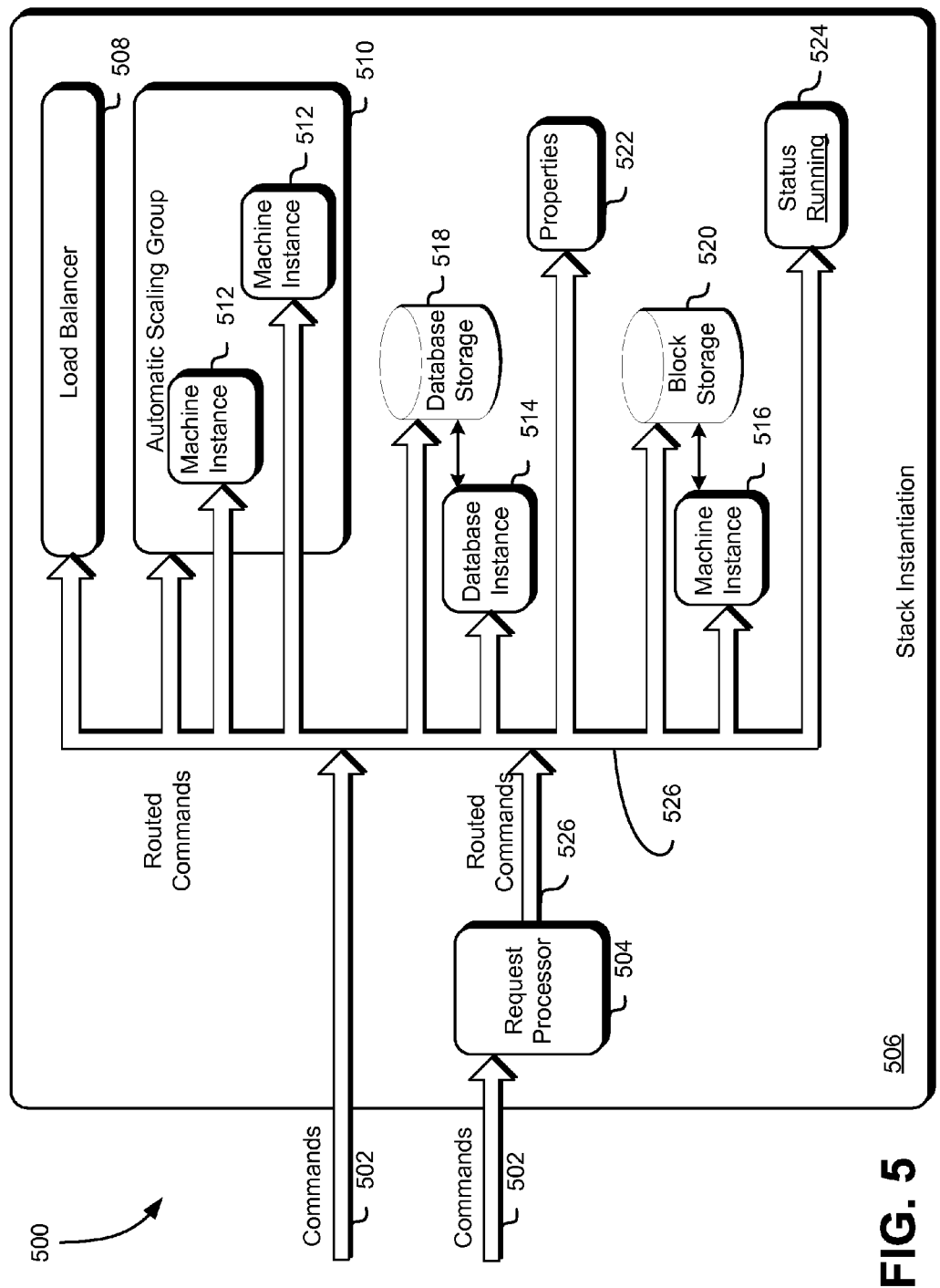
FIG. 5 illustrates an example environment in which commands sent to a computer system that may contain one or more computer resources may relay those commands to those computer resources in accordance with at least one embodiment.

FIG. 5 illustrates an example environment 500 containing a stack instantiation and how commands may be relayed to one or more computer resources within a computing system as described at least in connection with FIGS. 1-4, and in accordance with at least one embodiment. In some embodiments, commands 502 may be received by stack instantiation 506 as described at least in connection with FIGS. 1-4. The stack instantiation may, as described herein, be made up of a variety of computer resources as described at least in connection with FIG. 4. Examples of computer system resources, described herein and at least in connection with FIG. 4, may include, but are not limited to, load balancers 508, automatic scaling groups 510, scaling group machine instances 512, database instances 514, machine instances 516, database storage 518, block storage 520, stack instantiation properties 522 and/or stack instantiation statuses 524. In some embodiments, the commands 502 may be routed directly to the computer system resources of the stack instantiation directly as routed commands 526. In some embodiments, the commands 502 may be routed to a request processor 504 as described at least in connection with FIG. 2, and the request processor may re-route the commands to routed commands 526. In some embodiments, the request processor may alter the commands 502, or may issue new commands 526 as a result of commands 502, or may pass the commands 502 unaltered and/or may perform a combination of these functions. The stack instantiation may, in some embodiments, receive the commands by a combination of routing the commands directly to the computer resources and/or routing the commands through a request processor using the methods described herein.

Figure 6:
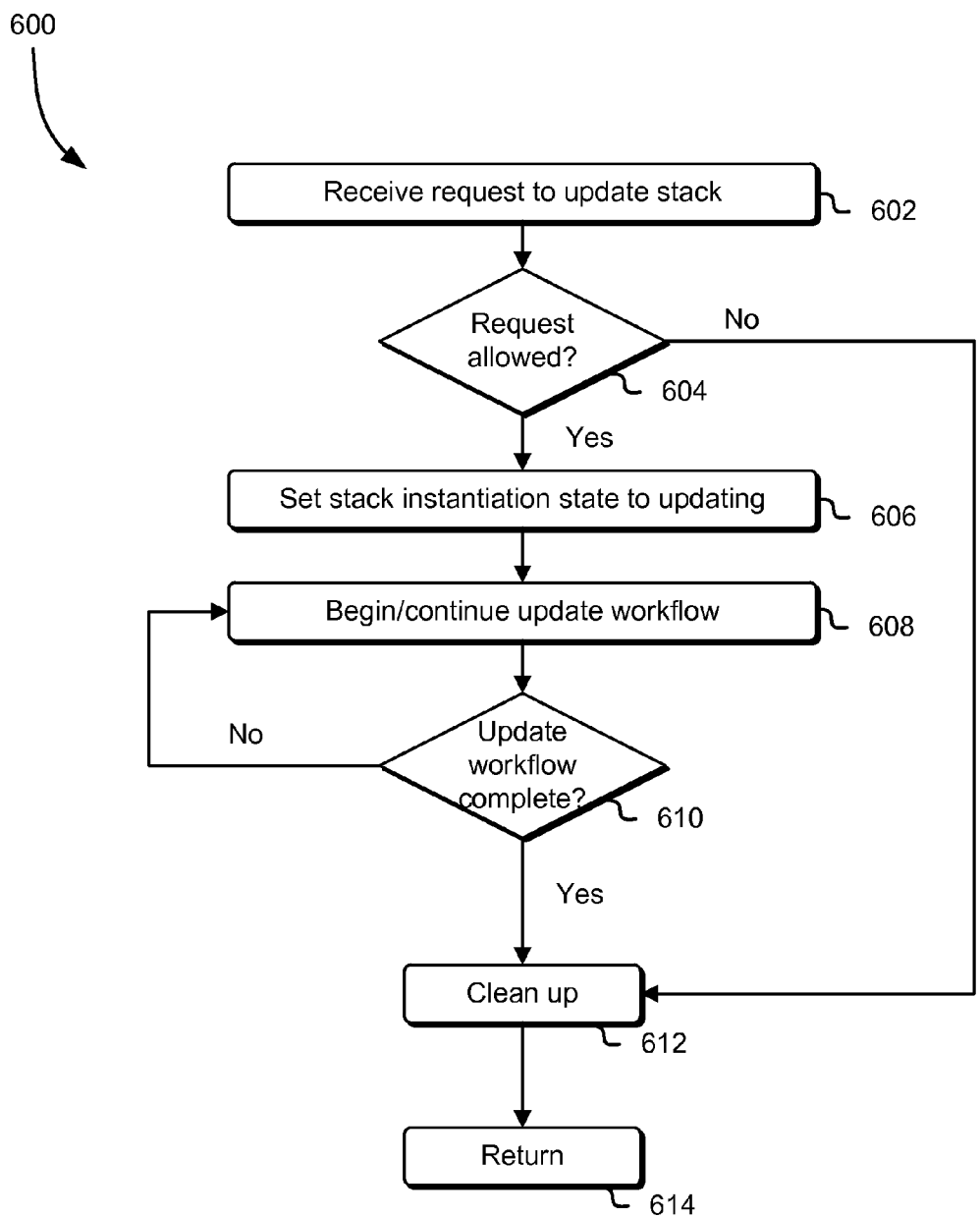
FIG. 6 illustrates an example process for sending an update request to computer resources in accordance with at least one embodiment.

FIG. 6 illustrates an example process 600 for starting an update request to computer resources within a computing system as described at least in connection with FIGS. 1-5, and in accordance with at least one embodiment. In some embodiments, a stack instantiation and/or one or more computer resources of the stack instantiation as described at least in connection with FIGS. 1-5 may perform process 600.

An entity associated with targeted systems and/or abstractions thereof receives 602 a request to update a stack. The request 602 may come from a requesting entity over a network as described at least in connection with FIGS. 1-3 and may be received by a receiving entity such as the command processor or workflow processor as described at least in connection with FIG. 2. In some embodiments, the receiving entity may first determine 604 if the update request is allowed. Factors for determining whether the request is allowed may include, but are not limited to, factors such as the nature of the requesting entity, the state of the computer resources, the state of the stack instantiation, the configuration of the stack instantiation or computer resources, system policy, results of one or more previous workflows and/or a combination of these and/or other factors. In the event that the receiving entity determines that the request is not allowed, the receiving entity may, in some embodiments, clean up 612 any system changes that may have occurred as a result of the request, including, but not limited to, changes in states, variables, statuses and/or configurations of the stack instantiation and/or the computer resources of the stack instantiation. Following the cleanup, the receiving entity may then return 614.

In the event that the receiving entity determines that the request is allowed, the receiving entity may set 606 the state of the stack instantiation to updating. In some embodiments, the receiving entity may then begin a workflow to update the stack as described at least in connection with FIG. 2. In some embodiments, the receiving entity may then determine 610 whether the update workflow is complete. Determination of whether the update workflow is complete may, in some embodiments, be periodic, or may be checked after each step, or may be as a result of a trigger, event, or alarm, or may be a step in the update workflow, or may be a combination of these and/or other methods. Determination that the update workflow is complete may come as a result of completing the final step, or of an error, or of a timeout, or of the evaluation of a condition, or as a combination of these and/or other conditions. In the event that the receiving entity determines that the update workflow is not complete, the receiving entity may then continue 608 the update workflow as described at least in connection with FIG. 2. In the event that the receiving entity determines that the update workflow is complete, the receiving entity may, in some embodiments, clean up 612 any system changes that may have occurred as a result of the request, including, but not limited to, changes in states, variables, statuses and/or configurations of the stack instantiation and/or the computer resources of the stack instantiation. Following the cleanup, the receiving entity may then return 614.

Figure 7:
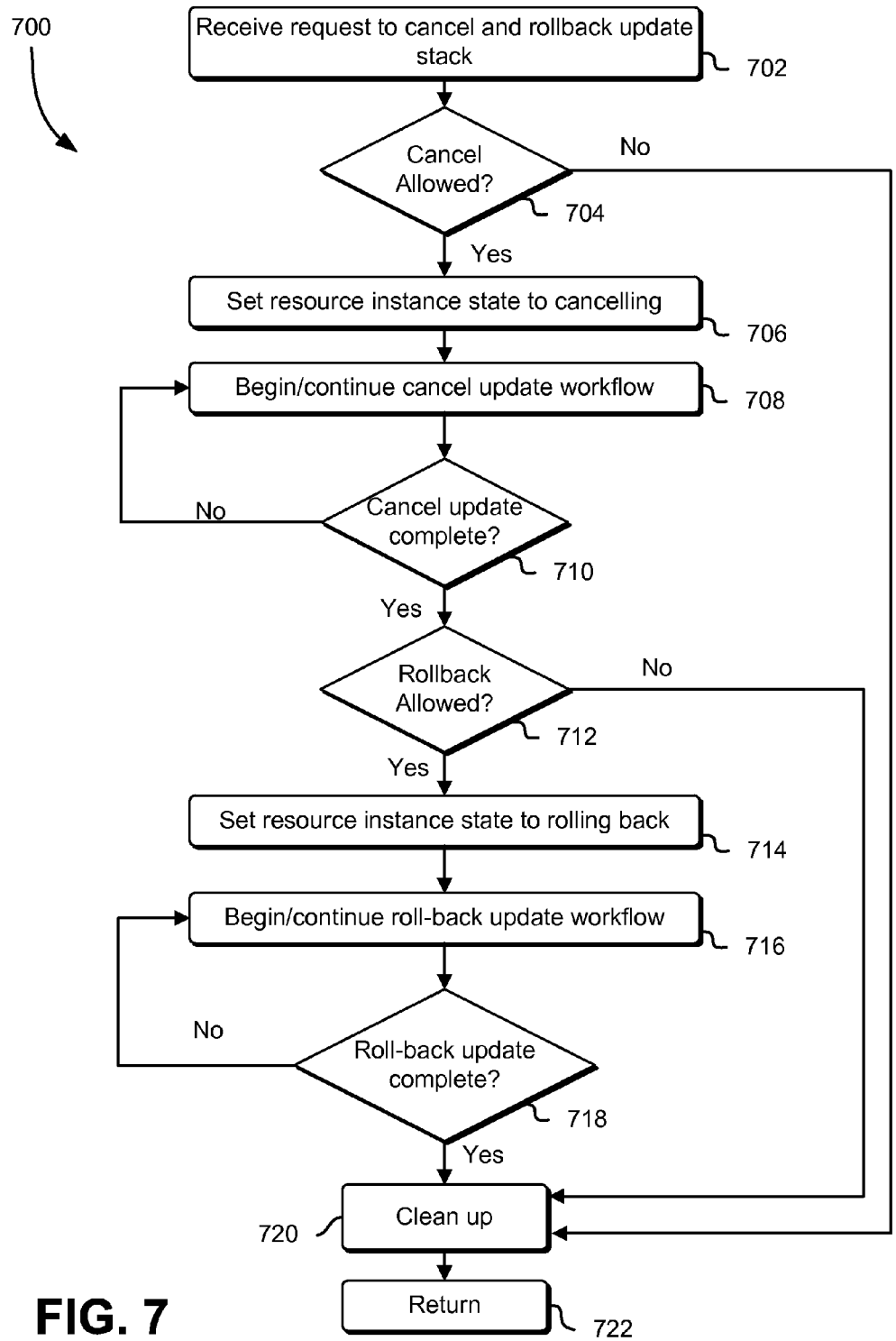
FIG. 7 illustrates an example process for cancelling an update request sent to computer resources in accordance with at least one embodiment.

FIG. 7 illustrates an example process 700 to cancel and rollback an update, as described at least in connection with FIG. 6, to computer resources within a computing system, as described at least in connection with FIGS. 1-5, and in accordance with at least one embodiment. In some embodiments, a stack instantiation and/or one or more computer resources of the stack instantiation as described at least in connection with FIGS. 1-5 may perform process 700.

An entity associated with targeted systems and/or abstractions thereof receives 702 a request to cancel and rollback a request to update a stack. The request 702 may come from a requesting entity over a network as described at least in connection with FIGS. 1-3 and may be received by a receiving entity as described at least in connection with FIG. 2. In some embodiments, the receiving entity may first determine 704 if the cancel aspect of the cancel and rollback update stack request is allowed. Factors for determining whether the cancel aspect of the request is allowed may include, but are not limited to, factors such as the nature of the requesting entity, the state of the computer resources, the state of the stack instantiation, the configuration of the stack instantiation or computer resources, system policy, results of one or more previous workflows and/or a combination of these and/or other factors. In the event that the receiving entity determines that the cancel aspect of the request is not allowed, the receiving entity may, in some embodiments, clean up 720 any system changes that may have occurred as a result of the request, including, but not limited to, changes in states, variables, statuses and/or configurations of the stack instantiation and/or the computer resources of the stack instantiation. Following the cleanup, the receiving entity may then return 722.

In the event that the receiving entity determines that the cancel aspect of the request is allowed, the receiving entity may set 706 the state of the stack instantiation to cancelling. In some embodiments, the receiving entity may then begin 708 the cancel update stack workflow as described at least in connection with FIG. 2. In some embodiments, the receiving entity may then determine 710 whether the cancel update stack workflow is complete. Determination of whether the cancel update stack workflow is complete may, in some embodiments, be periodic, or may be checked after each step, or may be as a result of a trigger, event, or alarm, or may be a step in the cancel update stack workflow, or may be a combination of these and/or other methods. Determination that the cancel update stack workflow is complete may come as a result of completing the final step, or of an error, or of a timeout, or of the evaluation of a condition, or as a combination of these and/or other conditions. In the event that the receiving entity determines that the cancel update stack workflow is not complete, the receiving entity may then continue 708 the cancel update workflow as described at least in connection with FIG. 2.

In the event that the receiving entity determines that the cancel update stack workflow is complete, the receiving entity may, in some embodiments, next determine 712 if the rollback aspect of the cancel and rollback update stack request is allowed. Factors for determining whether the rollback aspect of the request is allowed may include, but are not limited to, factors such as the nature of the requesting entity, the state of the computer resources, the state of the stack instantiation, the configuration of the stack instantiation or computer resources, system policy, results of one or more previous workflows and/or a combination of these and/or other factors. In the event that the receiving entity determines that the rollback aspect of the request is not allowed, the receiving entity may, in some embodiments, clean up 720 any system changes that may have occurred as a result of the cancel and rollback update stack request, including, but not limited to, changes in states, variables, statuses and/or configurations of the stack instantiation and/or the computer resources of the stack instantiation. Following the cleanup, the receiving entity may then return 722.

In the event that the receiving entity determines that the rollback aspect of the cancel and rollback update stack request is allowed, the receiving entity may set 714 the state of the stack instantiation to rolling back. In some embodiments, the receiving entity may then begin 716 the rollback update stack workflow as described at least in connection with FIG. 2. In some embodiments, the receiving entity may then determine 718 whether the rollback update stack request workflow is complete. Determination of whether the rollback update stack workflow is complete may, in some embodiments, be periodic, or may be checked after each step, or may be as a result of a trigger, event, or alarm, or may be a step in the rollback update stack workflow, or may be a combination of these and/or other methods. Determination that the rollback update stack workflow is complete may come as a result of completing the final step, or of an error, or of a timeout, or of the evaluation of a condition, or as a combination of these and/or other conditions. In the event that the receiving entity determines that the rollback update stack workflow is not complete, the receiving entity may then continue 716 the rollback update stack workflow as described at least in connection with FIG. 2. In the event that the receiving entity determines that the rollback update stack workflow is complete, the receiving entity may, in some embodiments, clean up 720 any system changes that may have occurred as a result of the cancel and rollback update stack request, including, but not limited to, changes in states, variables, statuses and/or configurations of the stack instantiation and/or the computer resources of the stack instantiation. Following the cleanup, the receiving entity may then return 722.

Figure 8:
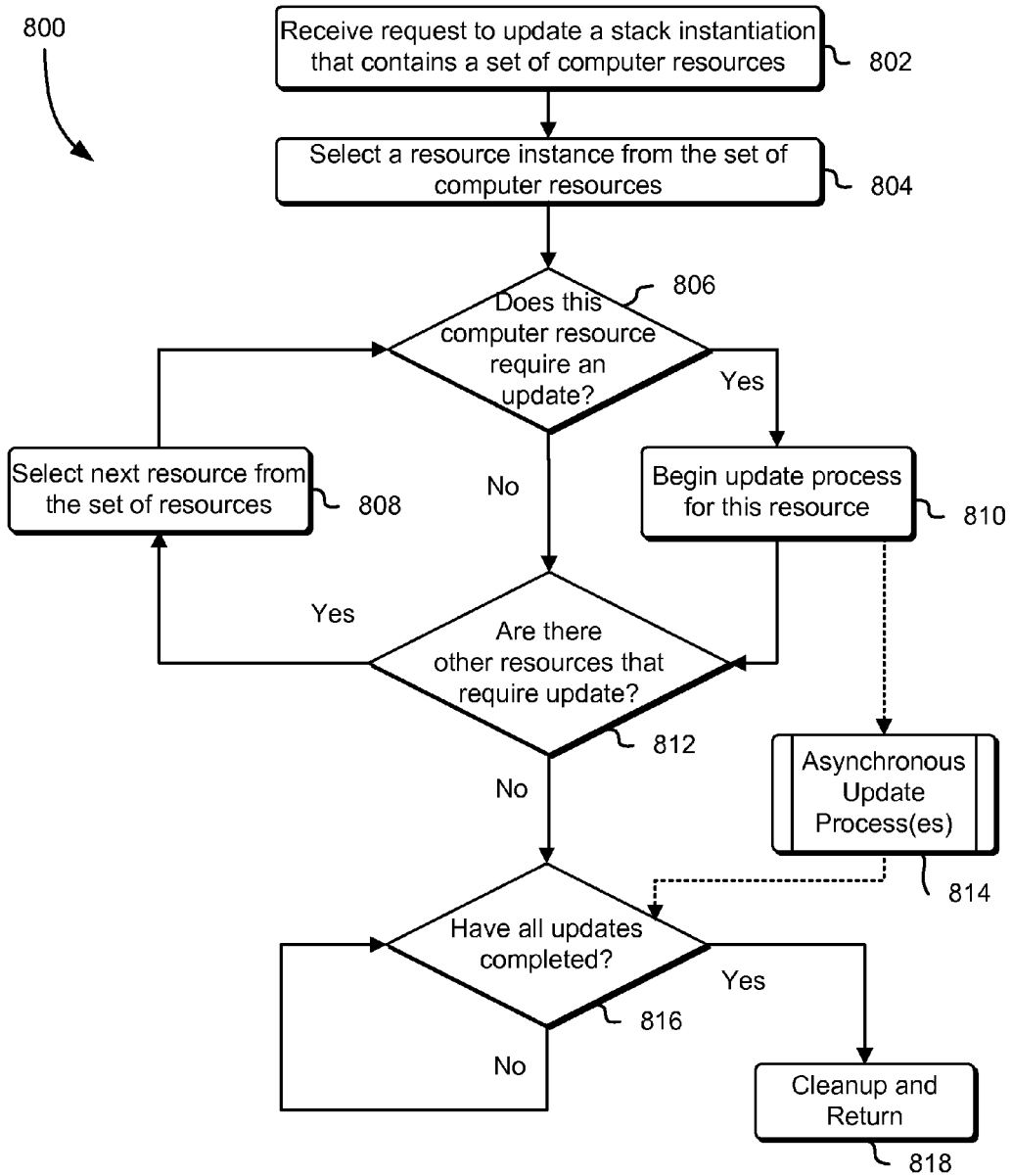
FIG. 8 illustrates an example process for sending an update to a computing system with a plurality of resources in accordance with at least one embodiment.

FIG. 8 illustrates an example process 800 for performing updates to a set of one or more computer resources within a computing system as described at least in connection with FIGS. 1-6, and in accordance with at least one embodiment. In some embodiments, a stack instantiation and/or one or more computer resources of the stack instantiation as described at least in connection with FIGS. 1-5 may perform process 800.

An entity associated with targeted systems and/or abstractions thereof receives 802 a request to update a stack instantiation that contains a set of computer resources as described at least in connection with FIGS. 2 and 4-6. The request 802 may come from a requesting entity over a network as described at least in connection with FIGS. 1-3 and may be received by a receiving entity as described at least in connection with FIG. 2. In some embodiments, the receiving entity may select 804 a resource from the set of computer resources of the stack instantiation. The selection may, in some embodiments, be determined by a certain order, or by system policy, or from a list or by a combination of these and/or other selection criteria. The receiving entity may then determine 806 if the selected computer resource requires an update. Criteria for determining whether the selected computer resource requires an update may, in some embodiments, include but not be limited to, the state of the computer resource, the state of the stack instantiation, the nature or contents of the update request, system policies, the nature or contents of the update request workflow or by a combination of these and/or other update criteria.

In the event that the receiving entity determines 806 that an update is required for the selected computer resource, the receiving entity may begin the update process 810 for this resource as described at least in connection with FIG. 6. In some embodiments, the receiving entity may complete the update process for the selected computer resource before proceeding to 812. In some embodiments, the receiving entity may begin the update process for the selected computer resource asynchronously 814, and proceed immediately to 816. In some embodiments, the receiving entity may process updates for computer resources both directly and asynchronously depending on a variety of system factors and policies.

After either determining 806 that no update is required for the selected computer resource, 810 applying the update or 814 asynchronously applying the update, the receiving entity may then determine 812 whether there are remaining computer resources that require an update. Criteria for determining whether there are remaining computer resources that require an update may include, but are not limited to, whether some or all computer resources have been updated, the result of other updates, system, stack instantiation or resource state, system policy, system resources or a combination of these and/or there criteria. In the event that there are remaining computer resources that require an update, the receiving entity may then select 808 the next computer resource from the set of resources. The selection may, in some embodiments, be determined by a certain order, or by system policy, or from a list or by a combination of these and/or other selection criteria. The receiving entity then returns to determine 806 whether the selected computer resource requires an update. Criteria for determining whether the selected computer resource requires an update may, in some embodiments, include but not be limited to, the state of the computer resource, the state of the stack instantiation, the nature or contents of the update request, system policies, the nature or contents of the update request workflow or by a combination of these and/or other update criteria.

In the event that the receiving entity determines 812 that there are no more computer resources that require updates, the receiving entity may, in some embodiments, determine 816 whether all updates have completed. In some embodiments, determining whether all updates have completed may involve querying asynchronous update processes 814 for a status or return result. In the event that all updates have not completed, the receiving entity may, in some embodiments, enter a state where it waits on the status of the updates until they are complete. In some embodiments, the receiving entity may pause itself and check the statuses of the updates periodically, according to a system timer. In some embodiments, the receiving entity may pause itself and check the statuses of the updates as a result of a system alert or alarm. In some embodiments, the receiving entity may allow a set time for all updates to complete. In some embodiments, the receiving entity may not wait for the updates to complete. After the updates have completed, the receiving entity may cleanup and return 818. Cleanup may, in some embodiments, involve removing, restoring or updating system changes that may have occurred as a result update stack request, including, but not limited to, changes in states, variables, statuses and/or configurations of the stack instantiation and/or the computer resources of the stack instantiation.

Figure 9:
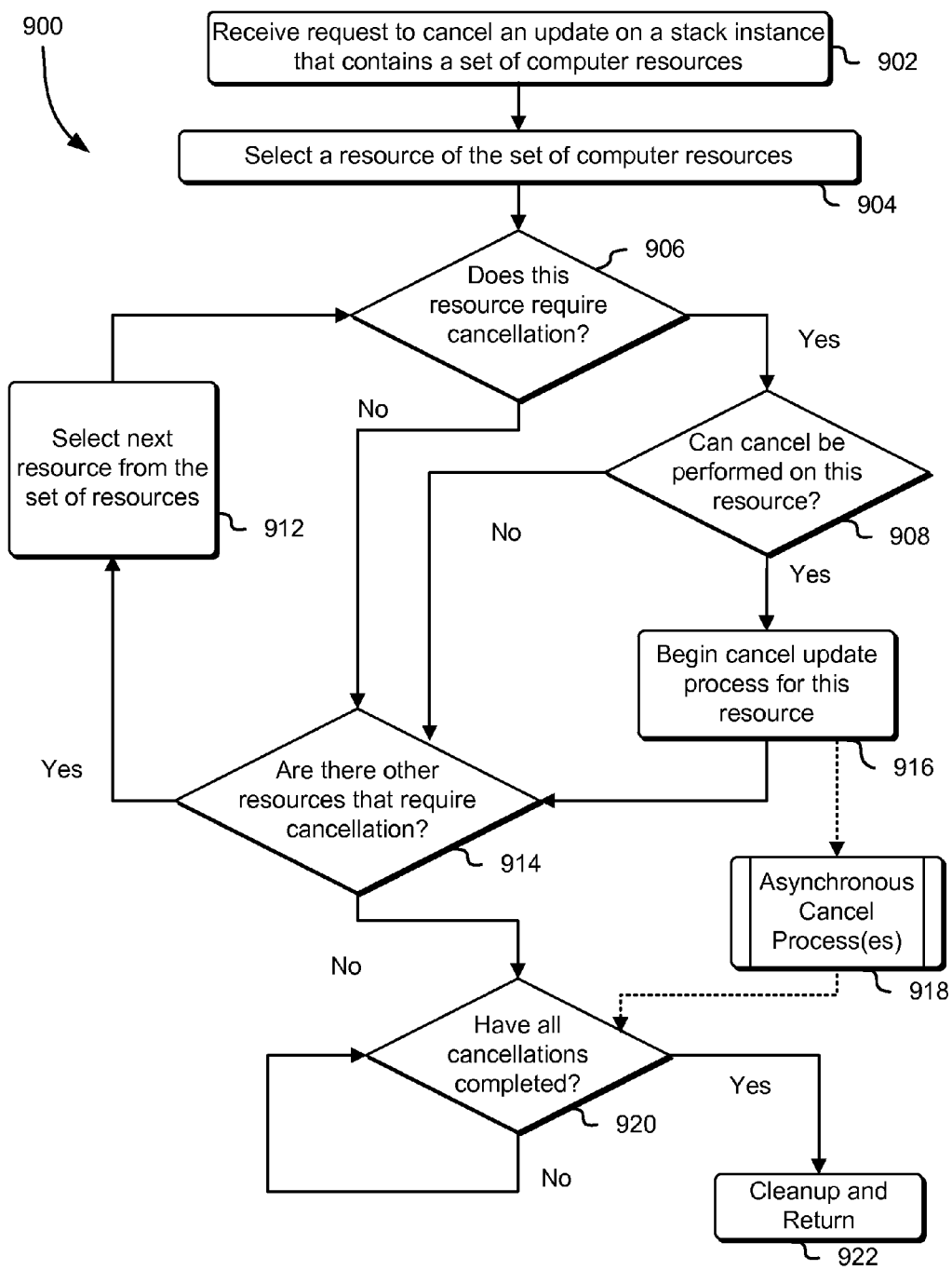
FIG. 9 illustrates an example process for cancelling an update request sent to a computing system with a plurality of resources in accordance with at least one embodiment.

FIG. 9 illustrates an example process 900 for cancelling an update stack request to a set of one or more computer resources within a computing system as described at least in connection with FIGS. 1-5 and 7, and in accordance with at least one embodiment. In some embodiments, a stack instantiation and/or one or more computer resources of the stack instantiation as described at least in connection with FIGS. 1-5 may perform process 900.

An entity associated with targeted systems and/or abstractions thereof receives 902 a request to cancel an update stack request for a stack instantiation that contains a set of computer resources as described at least in connection with FIGS. 2 and 4-6. The request 902 may come from a requesting entity over a network as described at least in connection with FIGS. 1-3 and may be received by a receiving entity as described at least in connection with FIG. 2. In some embodiments, the receiving entity may select 904 a resource from the set of computer resources of the stack instantiation. The selection may, in some embodiments, be determined by a certain order, or by system policy, or from a list or by a combination of these and/or other selection criteria. The receiving entity may then determine 906 if the selected computer resource requires a cancellation of the update stack request. Criteria for determining whether the selected computer resource requires a cancellation for the update stack request may, in some embodiments, include but not be limited to, the state of the computer resource, the state of the stack instantiation, the nature or contents of the update request, the nature or contents of the cancellation request, system policies, the nature or contents of the update request workflow, the nature or contents of the cancel update request workflow or by a combination of these and/or other cancellation criteria.

In the event that the receiving entity determines 906 that cancellation of an update stack request is required for the selected computer resource, the receiving entity may then determine 908 if a cancellation of an update stack request may be performed on the selected computer resource. Criteria for determining whether a cancellation of an update stack request for the selected computer resource may be performed may, in some embodiments, include but not be limited to, the state of the computer resource, the state of the stack instantiation, the nature or contents of the update or cancel update request, the progress or results of one or more update requests for the selected and/or for other computer resources, the nature or contents of the update cancellation request, the progress or results or one or more update cancellation requests, system policies, the nature or contents of the update request workflow, the nature or contents of the cancel update request workflow or by a combination of these and/or other cancellation criteria.

In the event that the receiving entity determines 908 that cancellation of an update stack request is allowed for the selected computer resource, the receiving entity may begin the cancel update stack request process 916 for this resource as described at least in connection with FIG. 7. In some embodiments, the receiving entity may complete the cancel update stack request process for the selected computer resource before proceeding to 914. In some embodiments, the receiving entity may begin the cancel update stack request process for the selected computer resource asynchronously 918, and proceed immediately to 920. In some embodiments, the receiving entity may cancel update stack requests for computer resources both directly and asynchronously depending on a variety of system factors and policies.

After either determining 906 that no cancel of an update stack request is required for the selected computer resource, determining 908 that no cancel of an update stack request is allowed for the selected computer resource, cancelling the update stack request 916 directly or cancelling the update stack request 918 asynchronously, the receiving entity may then determine 914 whether there are remaining computer resources that require a cancellation of an update stack request. Criteria for determining whether there are remaining computer resources that require cancellation of an update stack request may include, but are not limited to, whether some or all computer resources have been updated or cancelled, the result of other updates and cancellations, system, stack instantiation or resource state, system policy, availability of system resources or a combination of these and/or there criteria. In the event that there are remaining computer resources that require cancellation of an update stack request, the receiving entity may then select 912 the next computer resource from the set of resources. The selection may, in some embodiments, be determined by a certain order, or by system policy, or from a list or by a combination of these and/or other selection criteria. The receiving entity then returns to determine 906 whether the selected computer resource requires cancellation of an update stack request. Criteria for determining whether the selected computer resource requires cancellation of an update stack request may, in some embodiments, include but not be limited to, the state of the computer resource, the state of the stack instantiation, the nature or contents of the update or cancellation request, system policies, the nature or contents of the update or cancellation workflow or by a combination of these and/or other update criteria.

In the event that the receiving entity determines 914 that there are no more computer resources that require updates, the receiving entity may, in some embodiments, determine 920 whether all updates have completed. In some embodiments, determining whether all updates have completed may involve querying asynchronous update processes 918 for a status or return result. In the event that all updates have not completed, the receiving entity may, in some embodiments, enter a state where it waits on the status of the updates until they are complete. In some embodiments, the receiving entity may pause itself and check the statuses of the updates periodically, according to a system timer. In some embodiments, the receiving entity may pause itself and check the statuses of the updates as a result of a system alert or alarm. In some embodiments, the receiving entity may allow a set time for all updates to complete. In some embodiments, the receiving entity may not wait for the updates to complete. After the updates have completed, the receiving entity may perform one or more cleanup operations 922. Cleanup may, in some embodiments, involve removing, restoring or updating system changes that may have occurred as a result update stack request or of the cancel update stack request, including, but not limited to, changes in states, variables, statuses and/or configurations of the stack instantiation and/or the computer resources of the stack instantiation.

Figure 10:
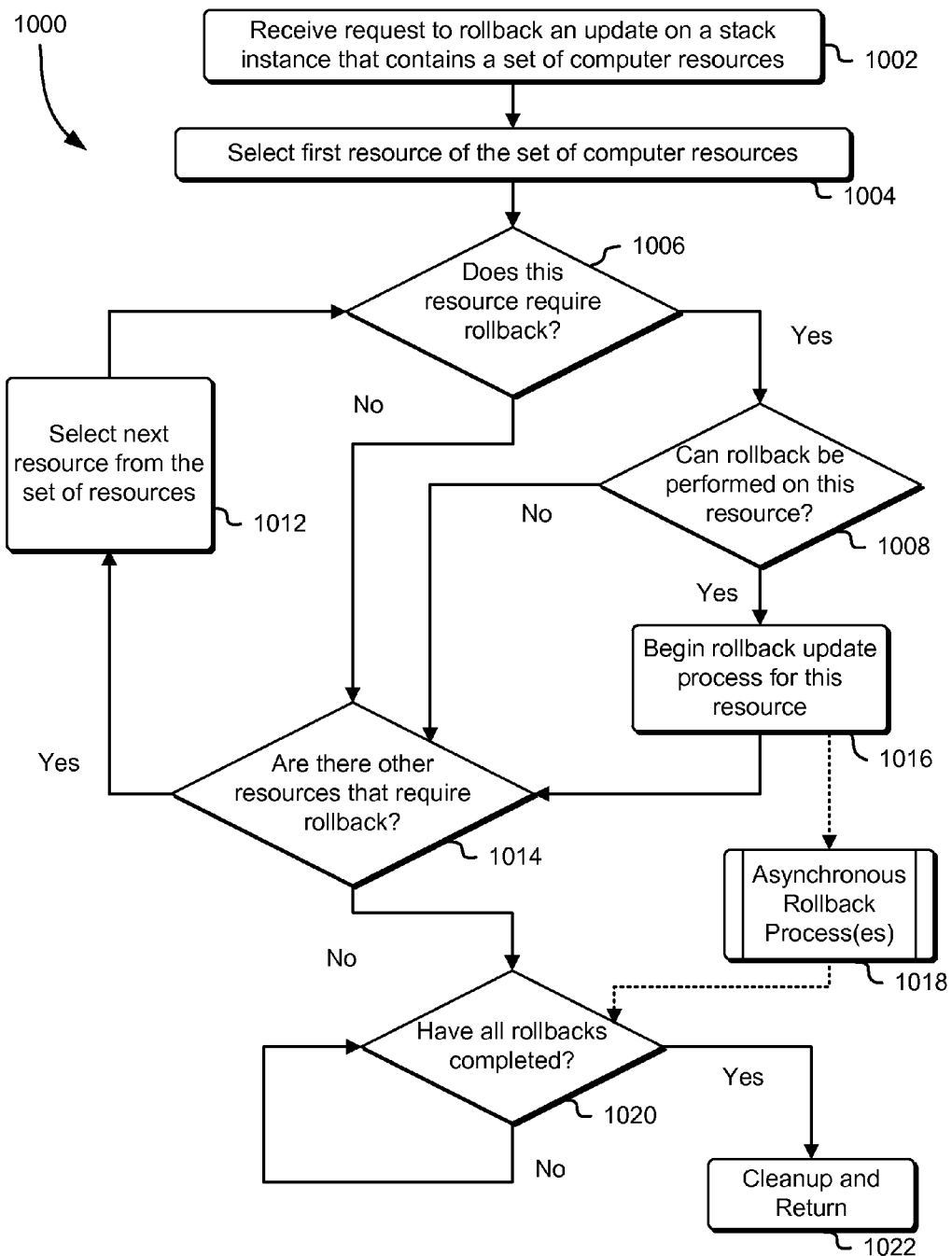
FIG. 10 illustrates an example process for rolling back an update request sent to computing system with a plurality of resources in accordance with at least one embodiment.

FIG. 10 illustrates an example process 1000 for rolling back an update stack request to a set of one or more computer resources within a computing system as described at least in connection with FIGS. 1-5 and 7, and in accordance with at least one embodiment. In some embodiments, a stack instantiation and/or one or more computer resources of the stack instantiation as described at least in connection with FIGS. 1-5 may perform process 1000.

An entity associated with targeted systems and/or abstractions thereof receives 1002 a request to rollback an update stack request for a stack instantiation that contains a set of computer resources as described at least in connection with FIGS. 2 and 4-6. The request 1002 may come from a requesting entity over a network as described at least in connection with FIGS. 1-3 and may be received by a receiving entity as described at least in connection with FIG. 2. In some embodiments, the receiving entity may select 1004 a resource from the set of computer resources of the stack instantiation. The selection may, in some embodiments, be determined by a certain order, or by system policy, or from a list or by a combination of these and/or other selection criteria. The receiving entity may then determine 1006 if the selected computer resource requires a rollback of the update stack request. Criteria for determining whether the selected computer resource requires a rollback for the update stack request may, in some embodiments, include but not be limited to, the state of the computer resource, the state of the stack instantiation, the nature or contents of the update request, the nature or contents of the cancellation request, the nature and contents of the rollback request, system policies, the nature or contents of the update request workflow, the nature or contents of the cancel update request workflow, the nature or contents of the rollback update request workflow or by a combination of these and/or other cancellation criteria.

In the event that the receiving entity determines 1006 that rollback of an update stack request is required for the selected computer resource, the receiving entity may then determine 1008 if a rollback of an update stack request may be performed on the selected computer resource. Criteria for determining whether a rollback of an update stack request for the selected computer resource may be performed may, in some embodiments, include but not be limited to, the state of the computer resource, the state of the stack instantiation, the nature or contents of the update, cancel update or rollback update request, the progress or results of one or more update or cancel update requests for the selected and/or for other computer resources, the nature or contents of the update rollback request, the progress or results or one or more update rollback requests, system policies, the nature or contents of the update request workflow, the nature or contents of the cancel update request workflow, the nature or content of the rollback update request workflow or by a combination of these and/or other cancellation criteria.

In the event that the receiving entity determines 1008 that rollback of an update stack request is allowed for the selected computer resource, the receiving entity may begin the rollback update stack request process 1016 for this resource as described at least in connection with FIG. 7. In some embodiments, the receiving entity may complete the rollback update stack request process for the selected computer resource before proceeding to 1014. In some embodiments, the receiving entity may begin the rollback update stack request process for the selected computer resource asynchronously 1018, and proceed immediately to 1020. In some embodiments, the receiving entity may rollback update stack requests for computer resources both directly and asynchronously depending on a variety of system factors and policies.

After either determining 1006 that no rollback of an update stack request is required for the selected computer resource, determining 1008 that no rollback of an update stack request is allowed for the selected computer resource, rolling back the update stack request 1016 directly or rolling back the update stack request 1018 asynchronously, the receiving entity may then determine 1014 whether there are remaining computer resources that require a rollback of an update stack request. Criteria for determining whether there are remaining computer resources that require rollback of an update stack request may include, but are not limited to, whether some or all computer resources have been updated, have had the update cancelled or have had the update rolled back, the result of other updates, cancellations and rollbacks, system, stack instantiation or resource state, system policy, availability of system resources or a combination of these and/or other criteria. In the event that there are remaining computer resources that require rollback of an update stack request, the receiving entity may then select 1012 the next computer resource from the set of resources. The selection may, in some embodiments, be determined by a certain order, or by system policy, or from a list or by a combination of these and/or other selection criteria. The receiving entity then returns to determine 1006 whether the selected computer resource requires rollback of an update stack request. Criteria for determining whether the selected computer resource requires cancellation of an update stack request may, in some embodiments, include but not be limited to, the state of the computer resource, the state of the stack instantiation, the nature or contents of the update or cancellation request, system policies, the nature or contents of the update or cancellation workflow or by a combination of these and/or other update criteria.

In the event that the receiving entity determines 1014 that there are no more computer resources that require updates, the receiving entity may, in some embodiments, determine 1020 whether all updates have completed. In some embodiments, determining whether all updates have completed may involve querying asynchronous update processes 1018 for a status or return result. In the event that all updates have not completed, the receiving entity may, in some embodiments, enter a state where it waits on the status of the updates until they are complete. In some embodiments, the receiving entity may pause itself and check the statuses of the updates periodically, according to a system timer. In some embodiments, the receiving entity may pause itself and check the statuses of the updates as a result of a system alert or alarm. In some embodiments, the receiving entity may allow a set time for all updates to complete. In some embodiments, the receiving entity may not wait for the updates to complete. After the updates have completed, the receiving entity may cleanup and return 1022. Cleanup may, in some embodiments, involve removing, restoring or updating system changes that may have occurred as a result update stack request or of the cancel update stack request, including, but not limited to, changes in states, variables, statuses and/or configurations of the stack instantiation and/or the computer resources of the stack instantiation.

Figure 11:
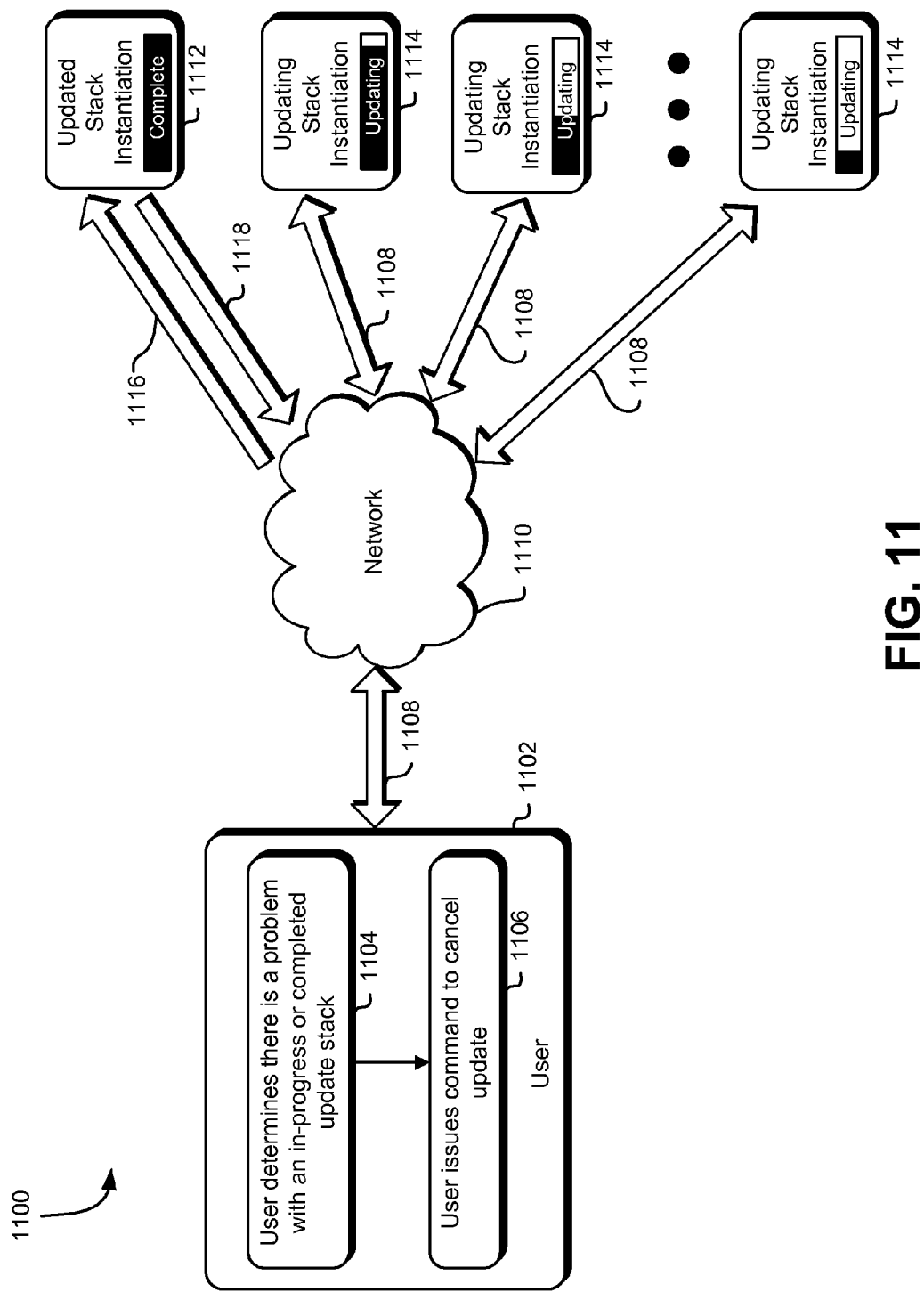
FIG. 11 illustrates an example implementation of a step from an example process for cancelling an update request sent to a computing system with a plurality of computer resources in accordance with at least one embodiment.

FIG. 11 illustrates an example environment 1100 for generating a command to cancel and rollback an update stack request to a set of one or more computer resources within one or more computing systems as described at least in connection with the processes of FIGS. 9 and 10, and at least in connection with FIGS. 1-5, and in accordance with at least one embodiment. One or more users 1102 connect to one or more stack instantiations 1112 and/or 1114 using one or more networks 1110 as described at least in connection with FIGS. 1-3. After an update stack request has been requested as described at least in connection with FIG. 6, the user may, in some embodiments, determine 1104 that there is a problem with the update stack request. The determination may come as a result of a number of factors, including, but not limited to, errors in the configuration, failure of this or another update stack request, missing resources, missing updates, incorrect versions or a combination of these and/or other factors. One example method for a determination may involve, in some embodiments, a request to update a stack 1116 that has completed for stack instance 1112, resulting in an error condition. As a result of the error condition, the stack instance 1112 may send an error report 1118 to user 1102, which may then make the determination that the stack updates for one or more stack instantiations 1114 should be cancelled. As a result of the determination, the user may, in some embodiments, issue 1106 a command to cancel and rollback the update stack request. The issued command 1108 may be received by one or more a receiving entities of one or more stack instantiations 1114 as described at least in connection with FIGS. 2, 5 and 7 and processed as described at least in connection with FIGS. 1-5 and 7-10.

Figure 12:
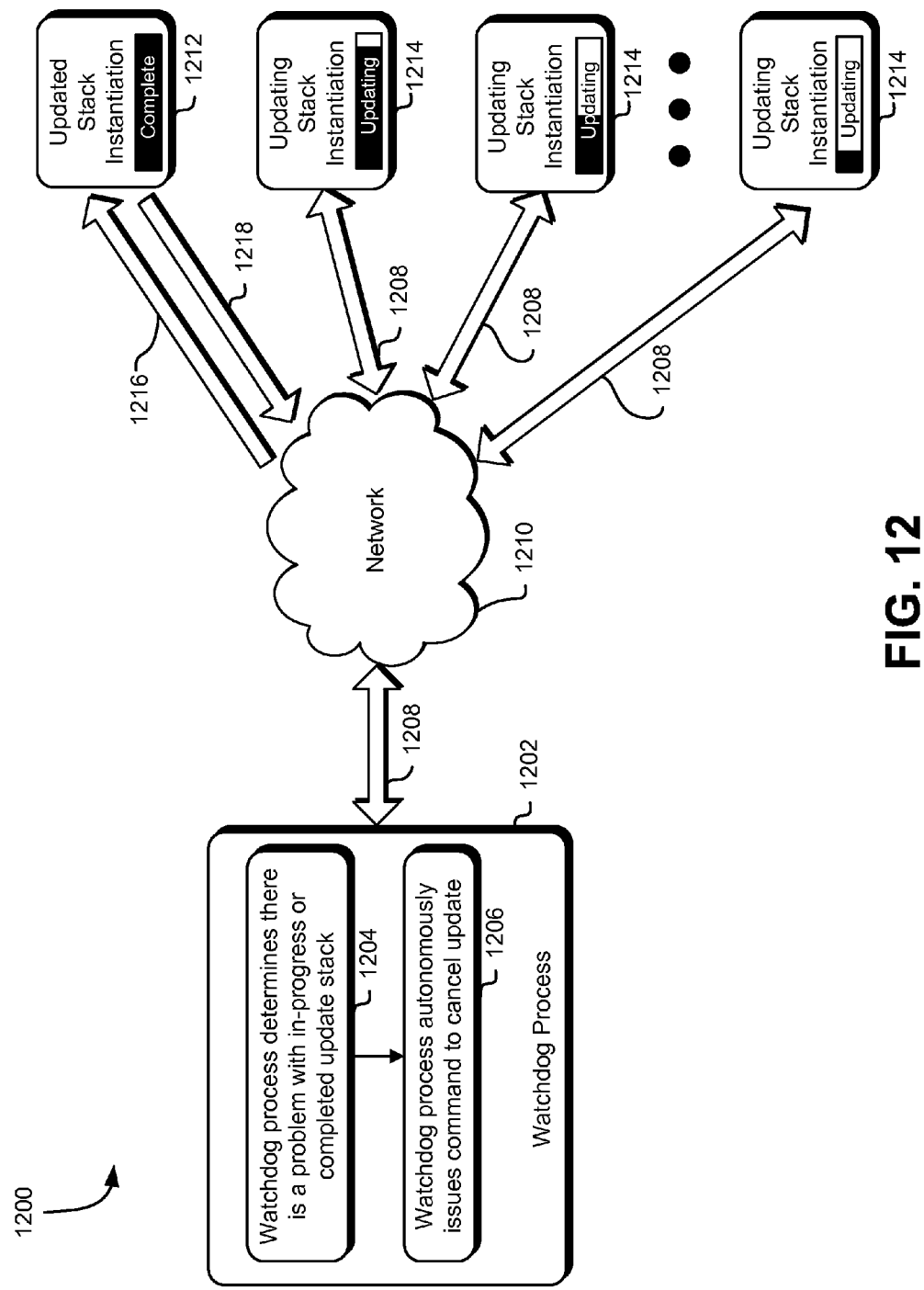
FIG. 12 illustrates an example implementation of a step from an example process for rolling back an update request sent to a computing system with a plurality of computer resources in accordance with at least one embodiment.

FIG. 12 illustrates an example environment 1200 for generating a command to cancel and rollback an update stack request to a set of one or more computer resources within one or more computing systems as described at least in connection with the processes of FIGS. 9 and 10, and at least in connection with FIGS. 1-5, and in accordance with at least one embodiment. One or more watchdog processes 1202 connect to one or more stack instantiations 1212 and/or 1214 using one or more networks 1210 as described at least in connection with FIGS. 1-3. The watchdog process may be a process running on a system connected to the network 1210 and/or entities associated therewith, such as servers or other computer systems also connected to the network, either directly or indirectly. After an update stack request has been requested as described at least in connection with FIG. 6, the watchdog process may, in some embodiments, determine 1204 that there is a problem with the update stack request. The determination may come as a result of a number of factors, including, but not limited to, errors in the configuration, failure of this or another update stack request, missing resources, missing updates, incorrect versions or a combination of these and/or other factors. One example method for a determination may involve, in some embodiments, a request to update a stack 1216 that has completed for stack instance 1212, resulting in an error condition. As a result of the error condition, the stack instance 1212 may issue an alert 1218 that may be caught by watchdog process 1202. The watchdog process may, in some embodiments, catch the alert 1218 by monitoring a network address, or by polling the stack instantiations, or by polling the computer resources of the stack instantiations or by a combination of these and/or other monitoring methods. The watchdog process 1206 may then issue a cancel and rollback the update stack request command 1208 to one or more stack instantiations 1214. The cancel and rollback update stack request command 1208 may be received by one or more a receiving entities of one or more stack instantiations 1214 as described at least in connection with FIGS. 2, 5 and 7 and processed as described at least in connection with FIGS. 1-5 and 7-10.

Figure 13:
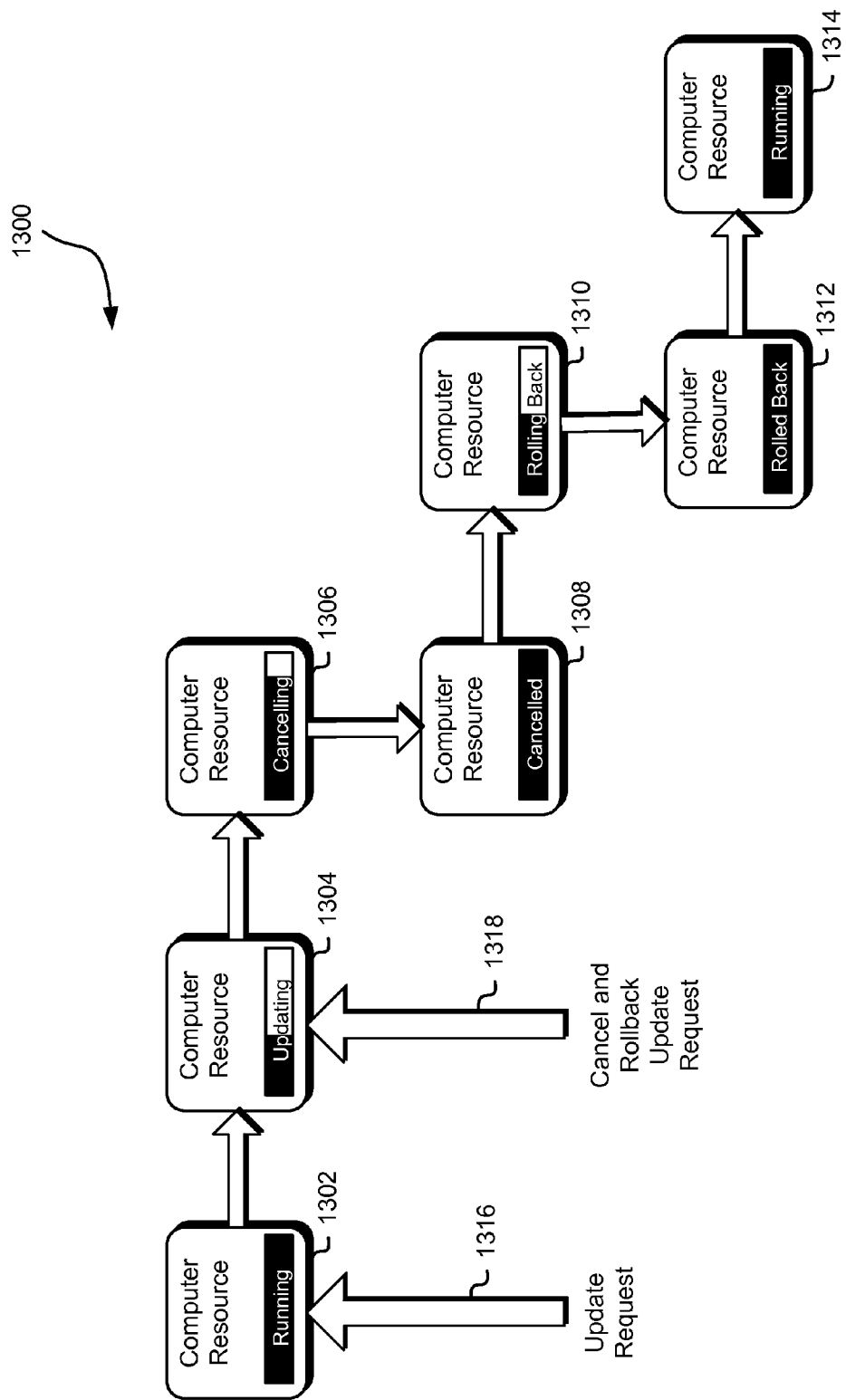
FIG. 13 illustrates an example environment in which an update request sent to a computing system with a plurality of computer resources may be cancelled and rolled back in accordance with at least one embodiment.

FIG. 13 illustrates an example environment 1300 in which an update request of a computing system with a plurality of computer resources is cancelled and rolled back, as described at least in connection with the processes of FIGS. 9 and 10, at least in connection with FIGS. 1-5 and in accordance with at least one embodiment. One or more running computer resources 1302 may receive an update request 1316 as described at least in connection with FIGS. 1-5. Upon receiving the update request, the computer resource may, in some embodiments, change state from a state such as running to a state such as updating. At some point after entering an updating state 1304, the computer resource may, in some embodiments, receive a cancel and rollback of the update request 1318. In some embodiments, the cancel and rollback of the update request 1318 may be received only when the computer resource is in an updating state. Upon receiving the cancel and rollback of the update request, the computer resource may, in some embodiments, change state from a state such as updating to a state such as cancelling. Upon entering a cancellation state 1306, the computer resource may, in some embodiments, begin a cancellation workflow or operation as described at least in connection with FIG. 9. At some point after beginning a cancellation workflow or operation, the cancellation workflow or operation may conclude. In some embodiments, the cancellation operation or workflow may conclude by completing all steps in the operation or workflow, as described at least in connection with FIG. 9. In some embodiments, the cancellation operation or workflow may conclude due to an error in the operation or workflow. In some embodiments, the cancellation operation or workflow may conclude without making changes to the computer resources. The computer resource may then change from a state such as cancelling to a state such as cancelled 1308.

Upon entering a cancelled state 1308, the computer resource may, in some embodiments, transition from a state such a cancelled to a state such as a rolling back 1310. In some embodiments, a transition from a state such as cancelled to a state such as rolling back may occur automatically, or as a result of a command received by and/or generated by the computer system and/or computer resource, or as the result of a timer or as a result of a combination of these and/or other triggering events. Upon entering a rolling back state 1310, the computer resource may, in some embodiments, begin a rollback workflow or operation as described at least in connection with FIG. 10. At some point after beginning a rollback workflow or operation, the rollback workflow or operation may conclude. In some embodiments, the rollback operation or workflow may conclude by completing all steps in the operation or workflow, as described at least in connection with FIG. 10. In some embodiments, the rollback operation or workflow may conclude due to an error in the operation or workflow. In some embodiments, the rollback operation or workflow may conclude without making changes to the computer resources. The computer resource may then change from a state such as rolling back to a state such as rolled back 1312. Upon entering a rolled back state 1312, the computer resource may, in some embodiments, transition from a state such a rolled back, back to a state such as a running 1314. In some embodiments, a transition from a state such as rolled back to a state such as running back may occur automatically, or as a result of a command received by and/or generated by the computer system and/or computer resource, or as the result of a timer or as a result of a combination of these and/or other triggering events.

In each of the operations and transitions described herein, there may be a number of different methods and/or steps in completing updates, cancellations, rollbacks and/or other workflows and operations on the one or more computer resources. In some embodiments, and for some of the one or more computer resources, an update may involve, for example, a commonplace computer resource update which updates individual software systems, alters configurations, adds systems, removes systems and/or a combination of these and other computer resource update operations. In such embodiments, a cancel operation may involve, for example, stopping any in-progress updates, terminating any pending updates and performing any state changes. Additionally, in such embodiments, a rollback operation may involve, for example, reversing any computer resource updates that were fully applied, undoing any partially completed computer resource updates that were cancelled while in progress and performing any state changes.

In some embodiments, and for some of the one or more computer resources, an update may involve, for example, creating new copies of one or more resources. In some embodiments, the creation of new copies of one or more resources may be as a result of requiring additional instances of existing resources or as a result of adding an entirely new resource. As an example, in some embodiments, before an update request an automatic scaling group may have a lower limit of two machine instances and may in fact be running with two machine instances. The update to the configuration of the scaling group may specify a minimum of four machine instances in the automatic scaling group. An update request in this example may require changing the lower limit and creating two new machine instances. A cancel of this update request may, for example, stop the creation of the new machine instances and a rollback for this update request may, for example, destroy the new machine instances. In some embodiments, an automatic scaling group that is being updated to go from two machine instances to four machine instances may, for example, require the creation of six new machine instances where two of the machine instances may be created in an updated or updating state to satisfy the requirements of the scaling group while four of the machine instances may be created in a running state to satisfy customer or user needs.

In some embodiments, the update request may, for example, perform an update in an iterative or rolling manner. Consider, for example, an automatic scaling group with four machine instances that are running, and each of the machine instances requires a computer system update. In some embodiments, the update may be processed by all four of the machine instances at the same time. In some other embodiments, the update may be processed one at a time, so that there are always three machine instances that are not affected by the update. In such embodiments, only the machine instance that was being actively updated may need to be cancelled but all updates for machine instances that were in progress or completed may need to be rolled back Just as an update may require creating new computer resources, so too may an update require deleting one or more computer resources. In some embodiments the update may require removing, for example, a database or a block storage instance. In such embodiments, cancelling the update may require stopping any in-progress operations for the deletion of the database or the block storage device and rolling back may require restoring the deleted database or block storage device and/or restoring any system configuration and/or state related to such a device. It should be noted that other methods of cancelling and rolling back a specified update request for a computer resource are also considered as being within the scope of the present disclosure. For an illustrative example, an update may require creating a group of new resources under control of a master resource, the corresponding cancel may do nothing if the new resources are not yet being served to customer because the master resource does not yet exist and the rollback may require simply deleting the resources and the master resource for a similar reason.

Figure 14:
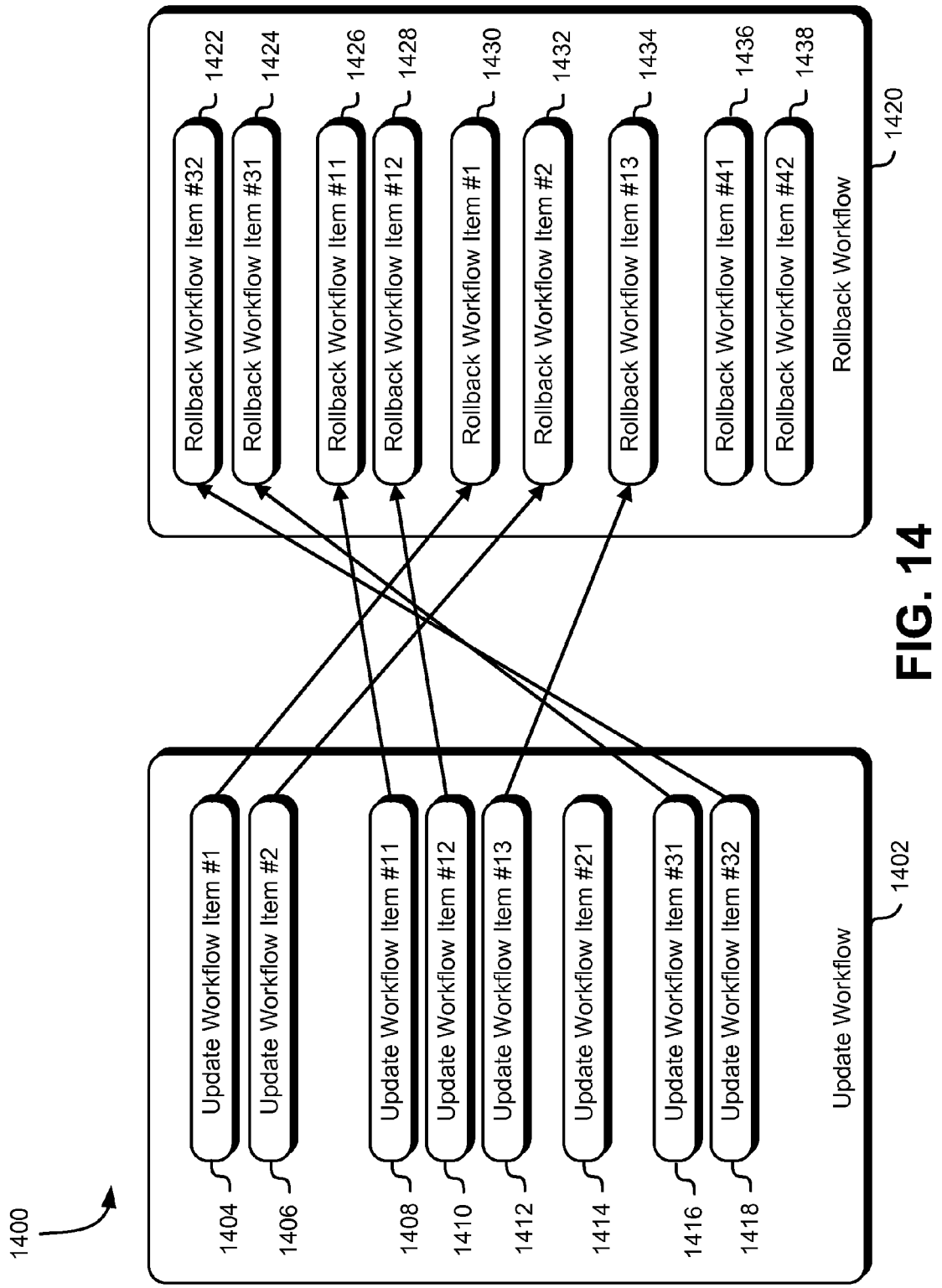
FIG. 14 illustrates a relationship between an example process for sending an update request to computer resources and an example process for rolling back that update request sent to computer resources, in accordance with at least one embodiment.

FIG. 14 illustrates an example environment 1400 comparing an example process for starting an update to computer resources as described at least in connection with FIG. 7 and FIGS. 1-5 in accordance with at least one embodiment and an example process for cancelling and rolling back that update to computer resources as described at least in connection with FIG. 7 and FIGS. 1-5 also in accordance with at least one embodiment. In some embodiments, a rollback workflow may consist of steps that undo steps from the update workflow in reverse order, or a rollback workflow may consist of steps that undo steps from the update workflow in the same order, or a rollback workflow may consist of steps that undo some steps from the update workflow in the same or reverse order, but interleave those steps with other steps, or a rollback workflow may include steps that have no relationship to steps from the update workflow, or a rollback workflow may not include steps that reverse steps from the update workflow or a rollback workflow may include combinations of these and/or other types of relationships to steps from the update workflow.

For example, in FIG. 14, in rollback workflow 1420, steps 1422 and 1424 are reverse order rollbacks of update workflow 1402, steps 1416 and 1418 reflecting that, in some embodiments, an operation such as "do A, then do B" may be rolled back by an operation such as "undo B, then undo A." For a further example, in FIG. 14, rollback workflow steps 1430 and 1432 are in-order rollbacks of update workflow steps 1404 and 1406 reflecting that, in some embodiments, an operation such as "do A, then do B" may be rolled back by an operation such as "undo A, then undo B." Similarly in FIG. 14, update workflow steps 1408 and 1410 may be are rolled back with rollback workflow steps 1426 and 1428, reflecting a similar in-order rollback as in the previous example, but 1434 the rollback of the companion update workflow step 1412 may be delayed in some embodiments until, for example, other operations are concluded and/or some other condition arises such as a timer or an external command. FIG. 14 also illustrates examples of update workflow steps 1414 that have no corresponding rollback workflow step and examples of rollback workflow steps 1436 and 1438 that have no corresponding update workflow steps. It should be noted that other relationships between of update and rollback workflow steps for a computer resource are also considered as being within the scope of the present disclosure. For an illustrative example, an update to a computer resource may require a simple one-step operation to patch a machine instance operating system while the corresponding rollback may require hundreds of separate steps to remove the patch.

Figure 15:
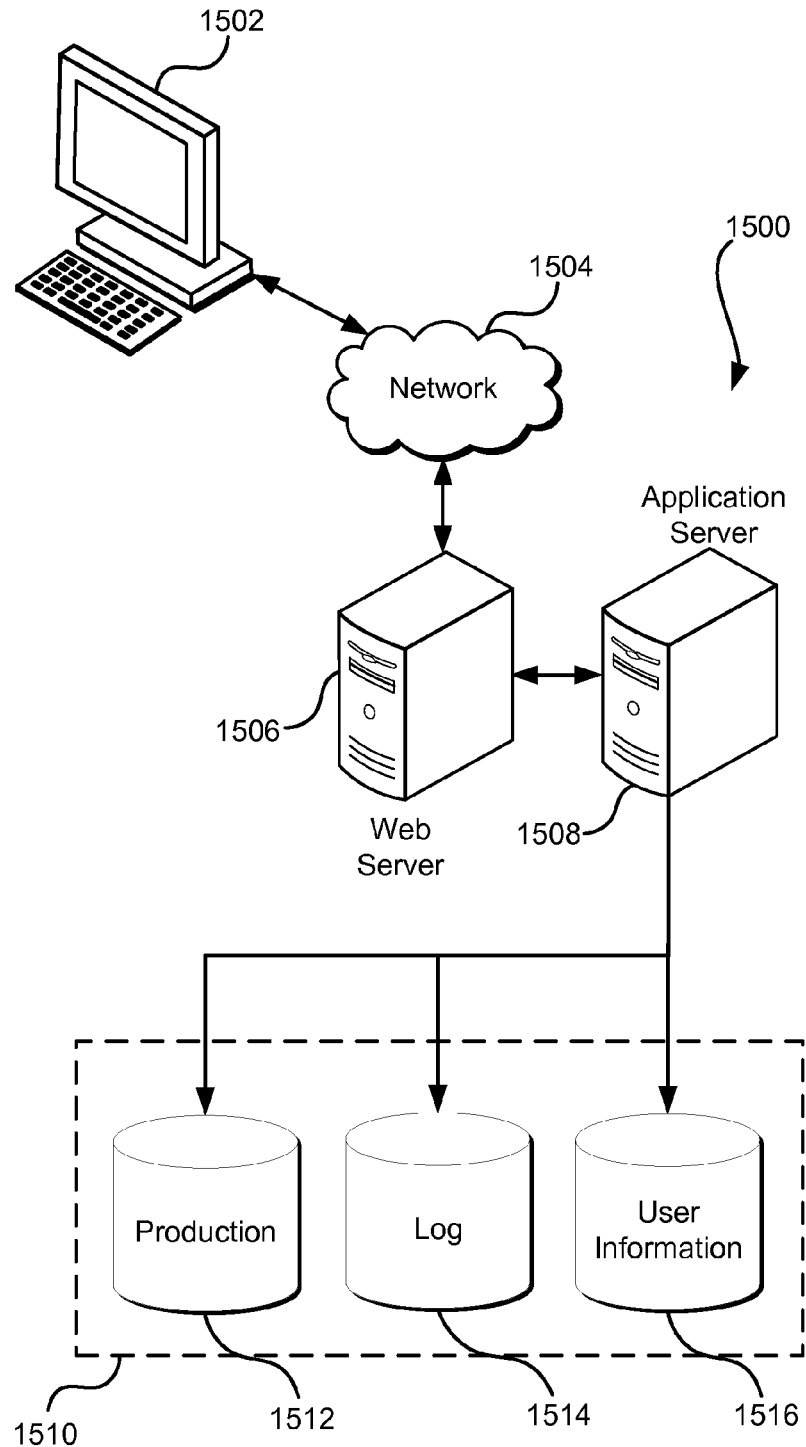
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1510 can include several separate data tables, databases or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for cancel and rollback of update stack requests, comprising:
    under the control of one or more computer systems configured with executable instructions, receiving a first request to update a stack instantiation that comprises a current state, a current stack describing a set of computer resources, the set of computer resources and an update stack describing an updated set of computer resources that includes a differing membership relative to the set of computer resources described by the current stack; and processing the received first request by at least:
- saving the current stack of the stack instantiation into a saved current stack;
- starting an update process on the stack instantiation using the update stack;
- before the started update process is complete, receiving a second request to cancel and rollback the first request to update the stack instantiation; and
- processing the received second request by at least:
  - cancelling the update process on the stack instantiation by at least:
    - examining the update process to determine if the update process contains one or more steps for updating the stack instantiation to reflect the differing membership of the updated set of computer resources;
    - cancelling pending steps of the one or more steps; and
    - stopping current steps of the one or more steps; and
  - rolling back the cancelled update process on the stack instantiation using the saved current stack.

2. The computer-implemented method of claim 1, wherein, prior to saving the current stack of the stack instantiation into a saved current stack, processing the received first request further comprises verifying the current state of the stack instantiation is a state from a set of states that can be updated.

3. The computer-implemented method of claim 1, wherein, prior to cancelling the update process on the stack instantiation, processing the received second request further comprises verifying the current state of the stack instantiation is a state from a set of states that can be cancelled.

4. The computer-implemented method of claim 1, wherein, prior to rolling back the cancelled update process on the stack instantiation using the saved current stack, processing the received second request further comprises verifying the current state of the stack instantiation is a state from a set of states that can be rolled back.

5. The computer-implemented method of claim 1, wherein, prior to rolling back the cancelled update process on the stack instantiation using the saved current stack, processing the received second request further comprises verifying that the cancellation of the update process on the stack instantiation has completed successfully.

6. The computer-implemented method of claim 1, wherein
examining the update process further comprises examining the set of computer resources to determine which have pending updates, are updating or have completed updating;
cancelling the pending steps further comprises cancelling the update for those computer resources that have pending updates;
stopping the current steps further comprises stopping the update for those computer resources that are updating; and
cancelling the update process further comprises marking those computer resources that have a completed update for further processing.

7. The computer-implemented method of claim 1, wherein:
examining the update process further comprises determining if the update process contains one or more steps for adding one or more computer resources to the stack instantiation;
the pending steps include pending steps to add computer resources;
the current steps include current steps to add computer resources; and
cancelling the update process on the stack instantiation further comprises marking added computer resources for further processing.

8. The computer-implemented method of claim 1, wherein:
examining the update process further comprises determining if the update process contains one or more steps for removing one or more computer resources to the stack instantiation;
the pending steps include pending steps to remove computer resources;
the current steps include current steps to remove computer resources; and
cancelling the update process on the stack instantiation further comprises marking removed computer resources for further processing.

9. A computer system comprising:
one or more processors; and
memory including executable instructions that, when executed by the one or more processors, cause the computer system to:
- initiate a set of one or more update operations on a stack instantiation having a plurality of computer resources; and
- process a request to cancel and rollback the set of one or more update operations on the stack instantiation, by at least:
  - causing the set of one or more update operations on the plurality of computer resources of the stack instantiation to be cancelled by at least:
    - causing examination of the set of one or more update operations so as to determine if the set of one or more update operations includes one or more operations for updating the stack instantiation to change membership of the plurality of computer resources;
    - causing cancellation of pending update operations of the set of one or more update operations; and
    - causing stoppage of current update operations of the one or more update operations; and
  - causing the cancelled update operations on the plurality of computer resources of the stack instantiation to be rolled back.

10. The computer system of claim 9, wherein, the request to cancel and rollback the update operations on the stack instantiation is autonomously generated by one or more resources of the computer system as a result of an error in at least one of the set of one or more update operations on a stack instantiation.

11. The computer system of claim 9, wherein the instructions further cause the stack instantiation to implement a receiving entity that receives the request to cancel and rollback update operations and that receiving entity processes the request by executing commands to at least:
cancel and rollback the updates on a first subset of the computer resources of the stack instantiation;
instantiate processes to cancel and rollback the updates on a second subset of the computer resources of the stack instantiation; and forward the cancel and rollback request to a third subset of the computer resources of the stack instantiation.

12. The computer system of claim 9, wherein the instructions further cause the stack instantiation to implement a workflow processor entity to process cancel and rollback operations and that workflow processor entity processes the cancel and rollback operations by executing commands to at least:
determine a proper order for the cancel and rollback operations; and
execute the cancel and rollback operations in the proper order.

13. The computer system of claim 9 wherein processing the request to cancel and rollback update operations further comprises, at a time after computer systems are rolled back, starting or restarting them autonomously.

14. The computer system of claim 9 wherein processing the request to cancel and rollback update operations further comprises causing the plurality of computer resources that have completed updating prior to receiving the request to be rolled back.

15. The computer system of claim 9, wherein causing the cancelled update operations on the computer resources of the stack instantiation to be rolled back includes:
instantiating a copy of the computer resource in a state analogous to a state the computer resource was in prior to initiating the set of update operations;
copying computer resource data from the updated computer resource to the copied computer resource;
deleting the updated computer resource; and
starting the copied computer resource.

16. A non-transitory computer-readable storage medium having collectively stored thereon executable instructions that, when executed by one or more processors of a computer system, cause the computer system to at least:
at a time after a request to cancel and rollback one or more of a set of update operations on a plurality of computer resources of a stack instantiation is received:
cause the one or more of the set of update operations on the plurality of computer resources of the stack instantiation to be cancelled by at least:
causing examination of the one or more of the set of update operations so as to determine whether the one or more of the set of update operations contains at least one update operation for updating the stack instantiation to change membership of the plurality of computer resources;
causing cancellation of pending update operations of the one or more of the set of update operations; and
causing stoppage of current update operations of the one or more of the set of update operations; and
for each update operation that has been cancelled, cause the cancelled update operation on the plurality of computer resources to be rolled back.

17. The non-transitory computer-readable storage medium of claim 16, wherein the instructions further cause the computer system to, upon receiving the request to cancel and rollback the update operations, at least:
determine if the update operation can be cancelled and rolled back, and when determined that the update operation can be cancelled and rolled back:
cancel the update operation; and
roll back the update operation.

18. The non-transitory computer-readable storage medium of claim 16, wherein:
cancellation of the update operations for a subset of the computer resources occur simultaneously; and
rollback of the update operations for a subset of the computer resources occur simultaneously.

19. The non-transitory computer-readable storage medium of claim 16, wherein causing the cancelled update operations on the computer system to be rolled back includes restoring the computer system to a running state by at least starting or restarting one or more of the plurality of computer resources if they were stopped or paused as a result of the update operations or cancellation of the update operations.

20. The non-transitory computer-readable storage medium of claim 16, wherein a failure or error in one or more cancellations of update operations precludes rollback for that and/or other update operations.

21. The non-transitory computer-readable storage medium of claim 16, wherein a failure or error in one or more rollbacks of update operations precludes rollback for one or more other update operations.

22. The non-transitory computer-readable storage medium of claim 16, wherein the instructions further cause the computer system to, upon receiving the request to cancel and rollback the update operations, at least:
verify that the request originated from a proper authority; and
validate that the request contains proper data.

* * * * *